(12) United States Patent
Katsuyama

(10) Patent No.: US 7,929,024 B2
(45) Date of Patent: Apr. 19, 2011

(54) PROGRAM CREATION APPARATUS FOR IMAGE PROCESSING CONTROLLER

(75) Inventor: Hidekazu Katsuyama, Osaka (JP)

(73) Assignee: Keyence Corporation, Osaka (JP)

( * ) Notice: Subject to any disclaimer, the term of this patent is extended or adjusted under 35 U.S.C. 154(b) by 379 days.

(21) Appl. No.: 12/256,123

(22) Filed: Oct. 22, 2008

(65) Prior Publication Data

US 2009/0122151 A1 May 14, 2009

(30) Foreign Application Priority Data

Nov. 13, 2007 (JP) ................................ 2007-294213

(51) Int. Cl.
*H04N 5/235* (2006.01)
*H04N 5/222* (2006.01)
*H04N 9/47* (2006.01)
*G06K 9/00* (2006.01)
*G06F 17/00* (2006.01)
*G06F 9/44* (2006.01)
*H04B 7/12* (2006.01)

(52) U.S. Cl. ........... 348/222.1; 348/333.01; 348/333.12; 348/91; 348/231.99; 382/141; 715/255; 717/110; 375/240.08

(58) Field of Classification Search ................ 348/222.1, 348/231.1, 333.01, 333.12, 91, 92, 94, 135; 382/141–147; 715/223, 235, 255, 723, 732; 386/278, 279; 375/240.08, 240.09
See application file for complete search history.

(56) References Cited

U.S. PATENT DOCUMENTS

| | | | |
|---|---|---|---|
| 6,535,630 B1 | 3/2003 | Saeki | |
| 6,549,655 B1 | 4/2003 | Ikushima et al. | |
| 6,665,441 B1 * | 12/2003 | Nishio | 382/209 |
| 6,704,441 B1 | 3/2004 | Inagaki et al. | |
| 6,774,909 B1 | 8/2004 | Nishio | |
| 6,807,288 B2 * | 10/2004 | Inagaki | 382/106 |
| 7,215,816 B2 * | 5/2007 | Ikushima | 382/227 |
| 7,274,812 B2 | 9/2007 | Saeki | |
| 7,403,218 B2 * | 7/2008 | Saeki | 348/86 |

FOREIGN PATENT DOCUMENTS

JP 09-288568 * 11/1997

* cited by examiner

*Primary Examiner* — Lin Ye
*Assistant Examiner* — Marly Camargo
(74) *Attorney, Agent, or Firm* — Kilyk & Bowersox, P.L.L.C.

(57) ABSTRACT

There is provided a program creation apparatus capable of displaying a camera image showing a measurement result in accordance with a position of an object to be tested, the apparatus including: a flow chart generating section for arranging processing units on an execution flow, to generate a flowchart; a program generating section for generating a control program for an image processing controller based upon the flowchart; and a display pattern generating section for associating screen components with processing units inside the flowchart and also arranging the screen components on an editor screen, to generate a display pattern in order to display a result of image processing.

6 Claims, 34 Drawing Sheets

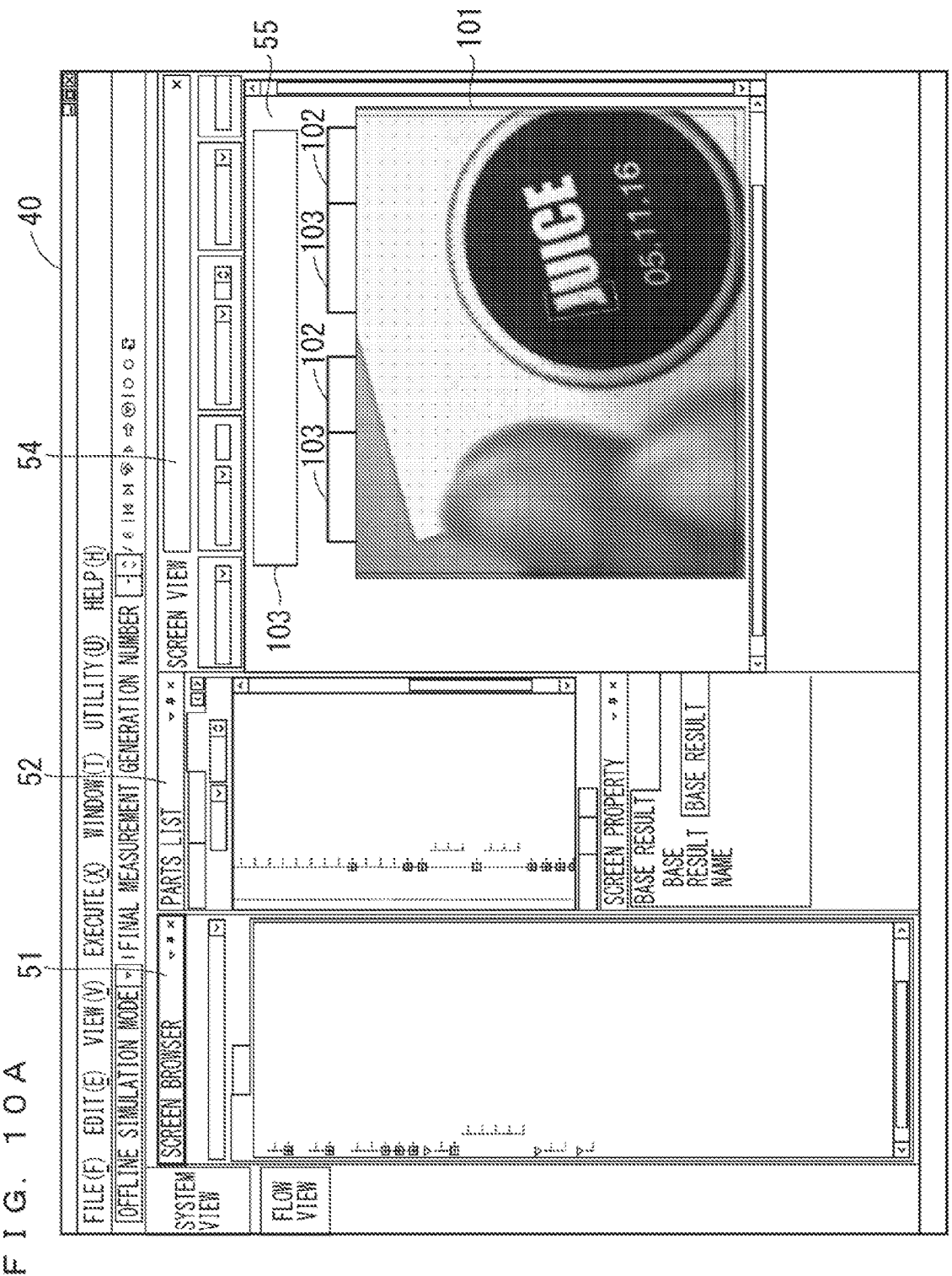

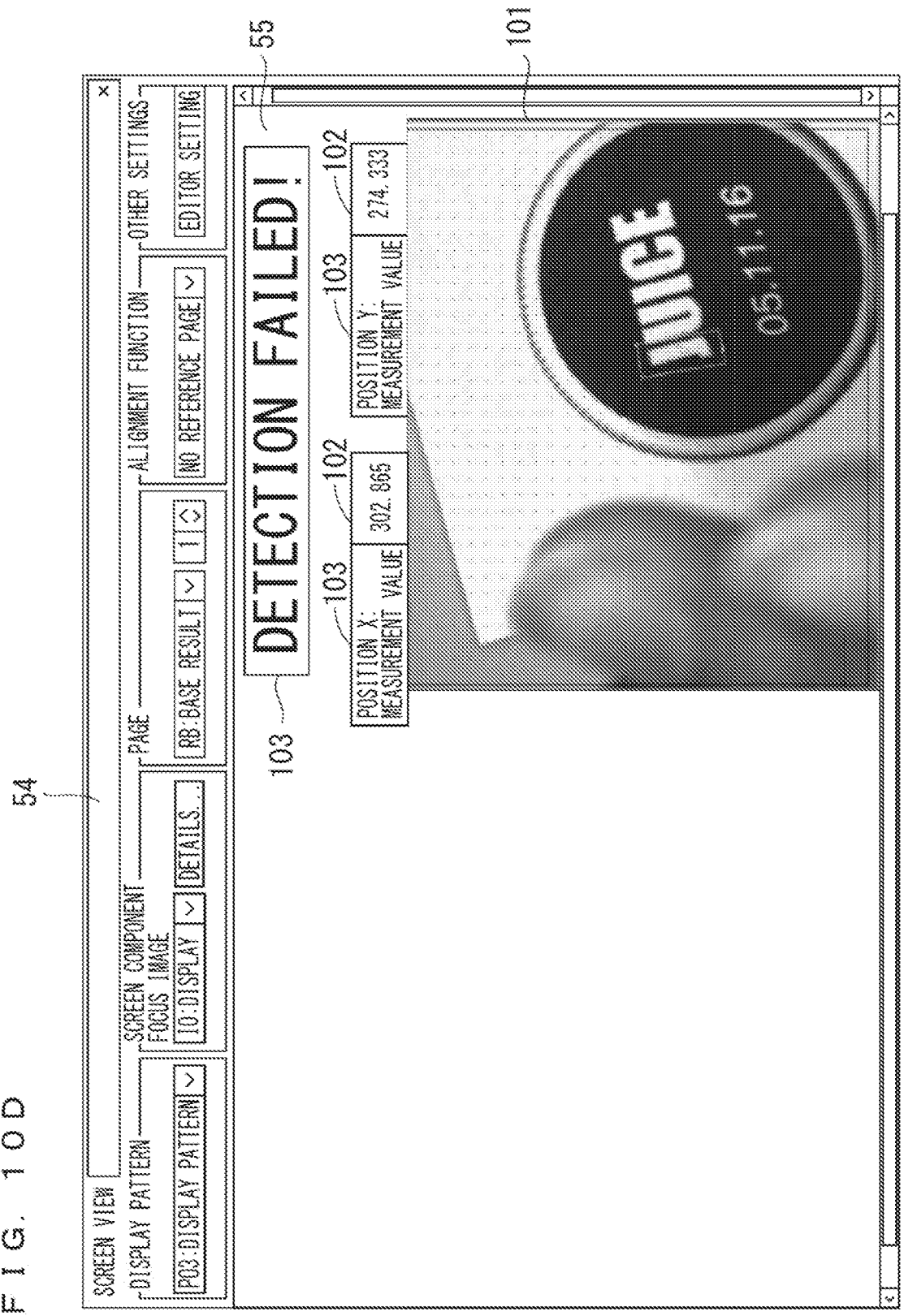

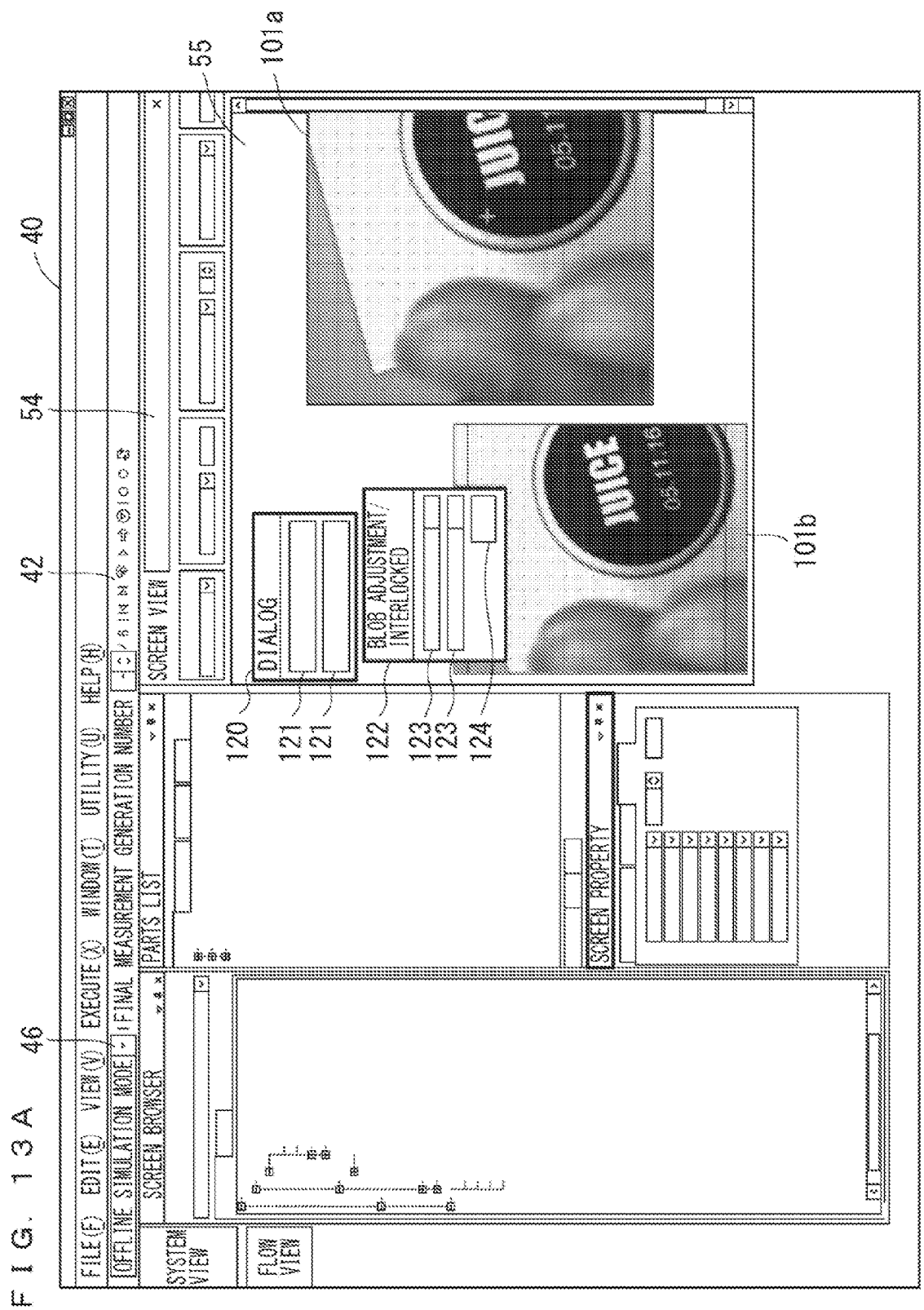

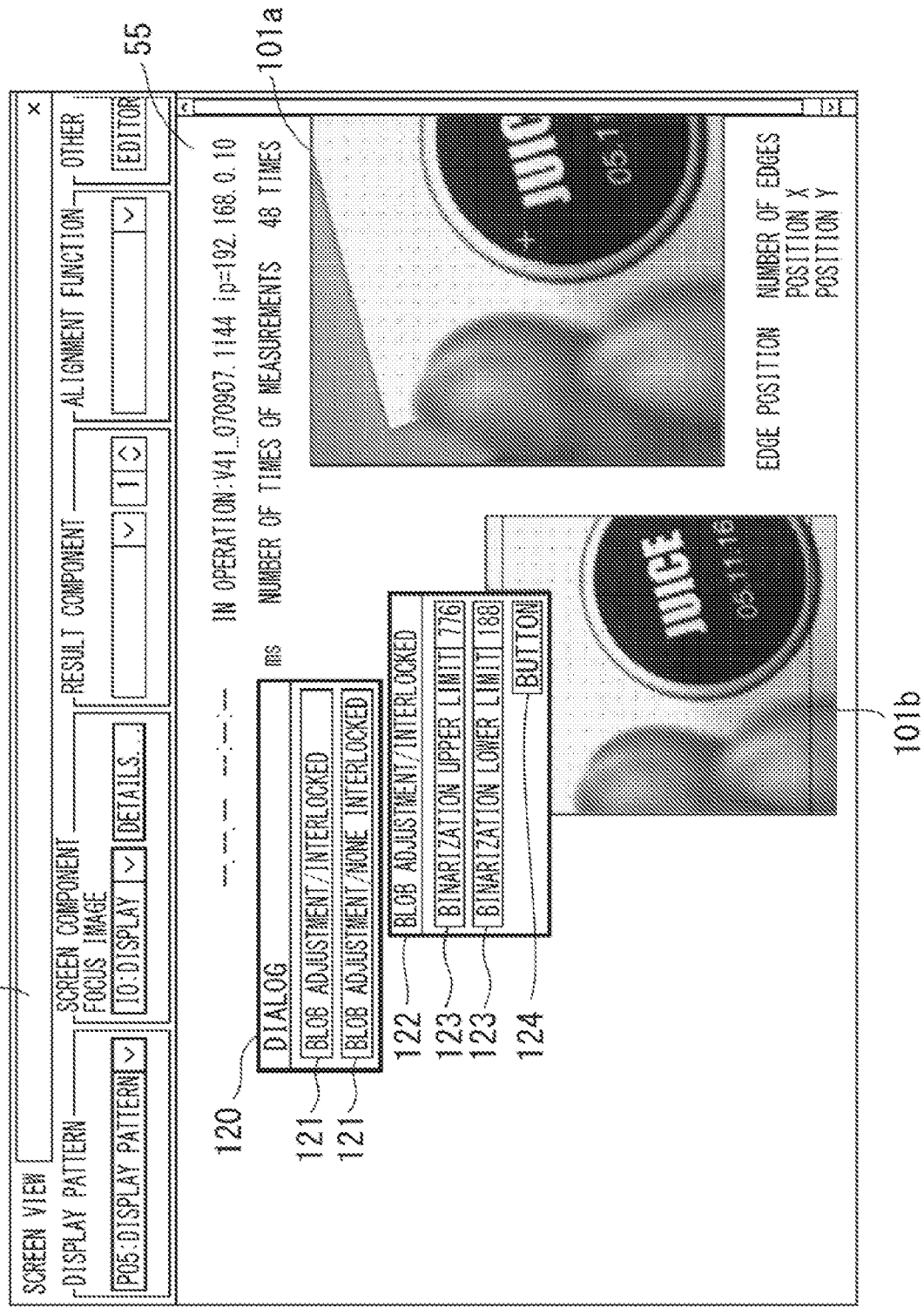

FIG. 17B

| | SELECT | ID | UNIT NAME | CAMERA NO. |
|---|---|---|---|---|
| | ☑ | 2 | EDGE POSITION | 1 |
| | ☐ | 3 | COLOR TEST | 1 |
| | ☐ | 4 | GRAPHIC DISPLAY | 1 |
| | ☐ | 5 | POSITION CORRECTION | 1 |

SCREEN PROPERTY

COMMON SETTING | UNIT SETTING | IMAGE SETTING

☐ SELECT ALL UNITS     EACH CAMERA

NUMBER OF DISPLAY REGIONS   SINGLE     DETAIL SETTING

UNIT SETTING LIST

ZOOM SETTING UNIT | EACH CAMERA

| OBJECT TO BE SWITCHED | INITIAL DISPLAY | UNIT ID | UNIT NAME | CAMERA NO. | IMAGE VARIABLE | COORDINATE AXIS | ZOOM SETTING | ZOOM TRACKING | COPY OF ZOOM INFORMATION | PASTE OF ZOOM INFORMATION |
|---|---|---|---|---|---|---|---|---|---|---|
| | | | | | | | | ZOOM TRACKING | ZOOM INFORMATION | |
| ☑ | ☐ | 2 | EDGE POSITION | 1 | &Cam1Img | BEFORE CORRECTION | DETECTION POSITION TRACKING | ✓ | ZOOM RATIO: 212% OFFSET POSITION: (-49, -79) LABEL SPECIFICATION: DETERMINATION LABEL | |

160 — 161  162

OK    CANCEL

F I G. 19B

| UNIT RESULT | | | | | | | |
|---|---|---|---|---|---|---|---|
| UNIT REFERENCE VARIABLE/RESULT | SYSTEM VARIABLE | LOCAL VARIABLE | GLOBAL VARIABLE | | | | |
| NAME | DEFINITION | HEAD INDEX | NUMBER OF DISPLAYS | CURRENT VALUE | INITIAL VALUE | |
| ⊞ !U[0009].RSLT | -- | -- | -- | -- | -- | RESULT |
| &Cam1Img | -- | -- | -- | -- | -- | IMAGE |

| UNIT RESULT | WATCH | EXECUTION LOG |

FIG. 19C

```
┌─ POSITION CORRECTION ────────────────────────────────────── ⊠ ┐
│                                                               │
│                         DISPLAY IMAGE [INPUT IMAGE ▼]         │
│                                                               │
│         ┌GENERAL│IMAGE SETTING│REFERENCE VALUE SETTING┐       │
│         │                                                     │
│         │ POSITION CORRECTION MODE [ONE POINT POSITION CORRECTION ▼]
│         │                                                     │
│         │ INTERPOLATION PROCESSING [DO NOT OPERATE INTERPOLATION ▼]
│         │                          [PROCESSING                ]│
│         │                                                     │
│         │ ┌─ REFERENCE DESTINATION SPECIFICATION ──────────┐ │
│         │ │ DETECTION POSITION SPECIFICATION - FIRST POINT │ │
│  171 ───┤ │                                                │ │
│         │ │ POSITION [U0011:PATTERN SEARCH    ▼]  ☐ INDIVIDUAL
│         │ │                                         SETTING │ │
│         │ │   x ☑ [                    ] = [  0.000 ⇕]     │ │
│         │ │   y ☑ [                    ] = [  0.000 ⇕]     │ │
│         │ │   θ ☑ [                    ] = [    0.0 ⇕]     │ │
│         │ │                                                │ │
│         │ │ DETECTION POSITION SPECIFICATION - SECOND POINT│ │
│         │ │ POSITION [                        ▼]  ☐ INDIVIDUAL
│         │ │                                         SETTING │ │
│         │ │   x ☑ [                    ] = [  0.000 ⇕]     │ │
│         │ │   y ☑ [                    ] = [  0.000 ⇕]     │ │
│         │ └────────────────────────────────────────────────┘ │
│         │                            [REFERENCE POSITION REGISTRATION(R)]
│         │ REFERENCE POSITION                                  │
│         │ SPECIFICATION    [VALID  ▼]  [>> (0)]  ── 172       │
│         │ ┌─ CORRECTION ──────────────────────────────────┐  │
│         │ │ OFFSET COORDINATE     [        ]  [        ]  │  │
│         │ │ ROTATIONAL CENTER     [        ]  [        ]  │  │
│         │ │ COORDINATE                                    │  │
│         │ │ ROTATION ANGLE        [        ]              │  │
│         │ └───────────────────────────────────────────────┘  │
│                                                               │
│                              [  OK  ] [ CANCEL ] [ APPLY ]    │
└───────────────────────────────────────────────────────────────┘
                                                         ── 170
```

F I G. 2 1 B

| UNIT RESULT | | | | | | | |
|---|---|---|---|---|---|---|---|
| UNIT REFERENCE VARIABLE/RESULT | SYSTEM VARIABLE | LOCAL VARIABLE | GLOBAL VARIABLE | | | | |
| NAME | DEFINITION | HEAD INDEX | NUMBER OF DISPLAYS | CURRENT VALUE | INITIAL VALUE | RESULT |
| ⊞ !U[0010].RSLT | — | — | — | — | — | RESULT |
| #blobDown | — | — | — | 0 | 0 | LOCAL |
| #blobUp | — | — | — | 0 | 0 | LOCAL |
| #x | — | — | — | 255 | 255 | LOCAL |
| #y | — | — | — | 255 | 255 | LOCAL |
| &Cam1Img | — | — | — | — | — | IMAGE |

| UNIT RESULT | WATCH | EXECUTION LOG |
|---|---|---|

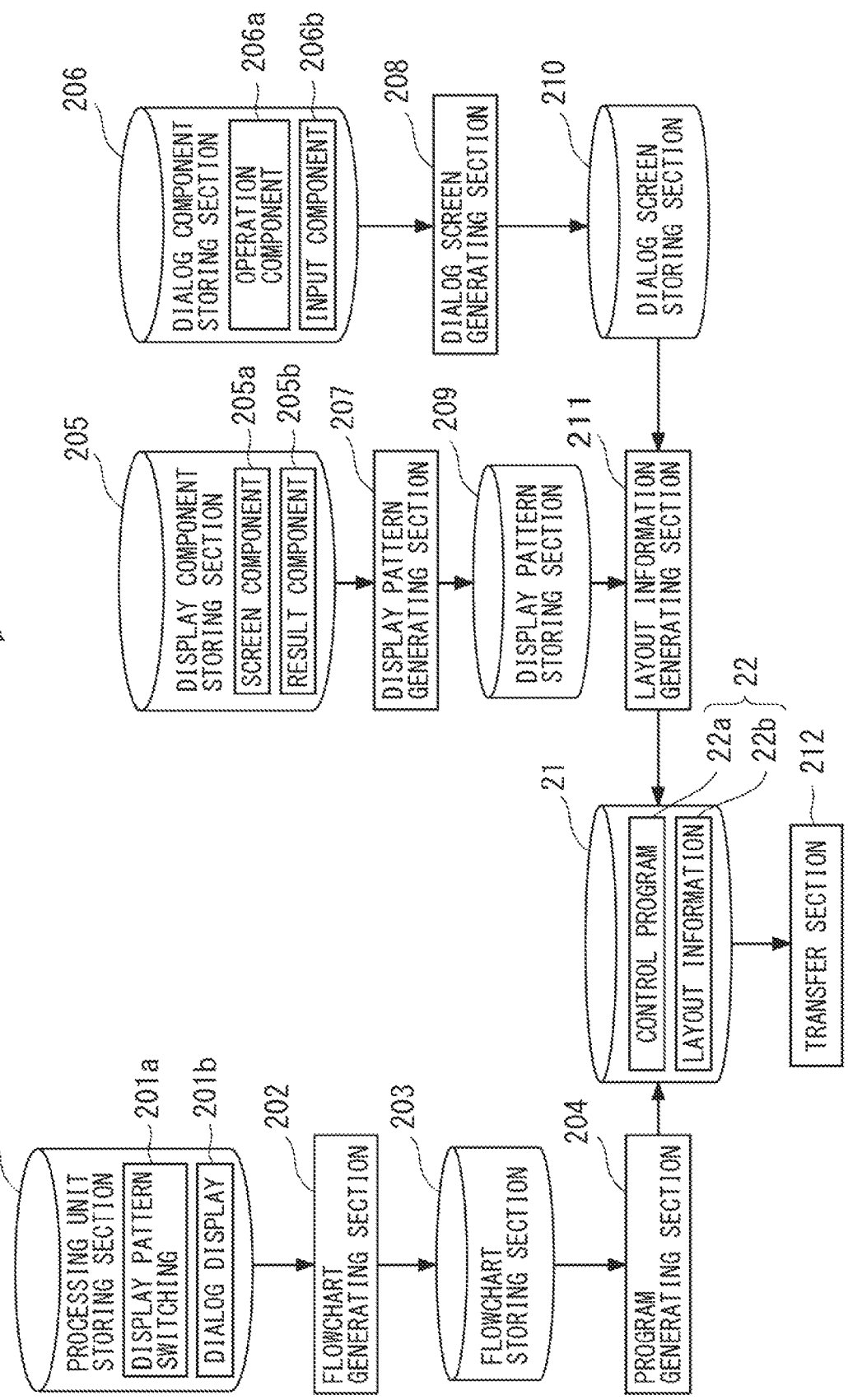

PROGRAM CREATION APPARATUS FOR IMAGE PROCESSING CONTROLLER

CROSS-REFERENCE TO RELATED APPLICATIONS

The present application claims foreign priority based on Japanese Patent Application No. 2007-294213, filed Nov. 13, 2007, the contents of which is incorporated herein by reference.

BACKGROUND OF THE INVENTION

1. Field of the Invention

The present invention relates to a program creation apparatus for an image processing controller, and more particularly, the present invention relates to an improvement in program creation apparatus which creates a control program for an image processing controller that outputs a determination signal based upon a camera image obtained by photographing an object to be tested.

2. Description of the Related Art

As an image processing controller which performs image processing on a camera image obtained by photographing an object to be tested and outputs as a processing result a determination signal indicating a determination result based upon a shape, a position and a camera image of the object to be tested, or the like, one capable of changing a series of processing procedure is known (e.g. Japanese Unexamined Patent Publication No. H09-288568). Typically, a control program for making such an image processing controller execute a series of processing procedure is created using an editor (software) operated on an information processing terminal such as a personal computer. A user can transfer the created control program to the image processing controller, so as to perform a desired test on the object to be tested.

Conventionally, a layout applied at the time of display of a camera image and a measurement result on a display by the image processing controller has been fixed by a system and thus unchangeable. Information defining such a display mode on the display is configured by arrangement information of display components for displaying a camera image and a measurement result. The display component for displaying a camera image is capable of displaying a camera image in which a measurement result such as a position of the object to be tested is shown inside an image region. Further, in a case of displaying a camera image by use of the display component, cutting out a part of the camera image and displaying the cut-out image can expand and display a specific image region. However, there has been a problem with the conventional system in that, since a camera image is cut out with a position inside an image region, previously specified by the user, as a center in a case of expanding and displaying the camera image, an object to be tested may not be displayed depending upon the position of the object to be tested.

SUMMARY OF THE INVENTION

As described above, there has been a problem with a conventional image processing controller in that, since a camera image is cut out with a position within an image region, previously specified by the user, as a center in a case of expanding and displaying a camera image, an object to be tested may not be displayed depending upon a position of the object to be tested.

The present invention was made in view of the above circumstances, and has an object to provide a program creation apparatus for an image processing controller, which is capable of appropriately displaying an object to be tested in a case of cutting out a part of a camera image and displaying the cut-out image on a display. Specifically, an object is to provide a program creation apparatus capable of displaying a camera image showing a measurement result in accordance with a position of an object to be tested.

A program creation apparatus for an image processing controller according to a first aspect of the present invention is a program creation apparatus for an image processing controller, that creates a control program for an image processing controller used in an image processing apparatus including: a camera that photographs an object to be tested, to generate a camera image; the image processing controller that extracts a measurement result from the camera image and determines the quality of the object to be tested based upon this measurement result, to output a determination signal; and a display that is display-controlled by the image processing controller and displays the measurement result. The program creation apparatus includes: a display component storing part for holding, as display components to be arranged on the display, a camera image display component for displaying the camera image and a measurement result display component for displaying the measurement result; a processing unit storing part for holding two or more processing units showing image processing in which a parameter is changeable; a flow chart generating part for arranging the processing units on an execution flow that is started with a start symbol and completed with an end symbol, to generate a flowchart; a program generating part for generating a control program for the image processing controller based upon the flowchart; a display pattern generating part for associating the display components with the processing units inside the flowchart and also arranging the display components on an edition screen, to generate a display pattern made of arrangement information of two or more display components associated with the processing units in order to display a result of image processing; and a transfer part for transferring the control program and the display pattern to the image processing controller, wherein the camera image display component is a display component that cuts out a part of the camera image and displays the cut-out image on the display, as well as a display component that cuts out a camera image and displays the cut-out image based upon an image processing result of the processing unit associated by the display pattern generating part.

In this program creation apparatus, a flowchart is created by arranging processing units on an execution flow, and based upon this flowchart, a control program for an image processing controller is created. In order to display a result of image processing, display components are associated with processing units inside the flowchart and the display components are arranged on an edition screen, so that a display pattern is created which includes arrangement information of a plurality of display components associated with the processing units. Since the camera image display component cuts out a camera image based upon an image processing result of the processing unit at the time of cutting out a part of a camera image and displaying the cut-out image on the display, a camera image showing the processing result of the processing unit can be appropriately displayed.

A program creation apparatus for an image processing controller according to a second aspect of the present invention is configured such that, in addition to the above configuration, the processing unit storing part holds as the processing unit a measurement unit that measures the inside of an image region, previously specified as an object to be tested, in the camera image and generates, as the measurement result, positional information showing a position of the object to be tested inside this image region, and the camera image display component is a display component that cuts out a camera image based upon the positional information of the measurement unit. With such a configuration, since a camera image is cut out based upon positional information showing a position of the object to be tested, a camera image showing a measurement result of a measurement unit can be displayed in accordance with the position of the object to be tested.

A program creation apparatus for an image processing controller according to a third aspect of the present invention is configured such that, in addition to the above configuration, in a case where a first of the measurement unit is a processing unit that decides an image region as an object to be tested based upon the positional information of a second of the measurement unit and measures the image region, the camera image display component is a display component that cuts out a camera image based upon the image region decided by the first measurement unit. With such a configuration, since a camera image is cut out based upon an image region decided by the first measurement unit as an object to be tested, a camera image showing a processing result of the first measurement unit can be appropriately displayed in accordance with a position of the image region.

The program creation apparatus for an image processing controller according to a fourth aspect of the present invention is configured such that, in addition to the above configuration, the camera image display component is a display component that cuts out a camera image such that the object to be tested is located at the center of a display region at the time of displaying the camera image.

The program creation apparatus for an image processing controller according to a fifth aspect of the present invention is configured such that, in addition to the above configuration, the camera image display component is a display component that expands and displays a camera image as compared with a display component that displays a whole camera image.

According to the program creation apparatus for an image processing controller in the present invention, since the camera image display component cuts out a camera image based upon an image processing result of the processing unit at the time of cutting out a part of a camera image and displaying the cut-out image on the display, a camera image showing the processing result of the processing unit can be appropriately displayed. In particular, since a camera image is cut out based upon positional information showing a position of the object to be tested, a camera image showing a measurement result of a measurement unit can be displayed in accordance with the position of the object to be tested.

BRIEF DESCRIPTION OF THE DRAWINGS

FIG. 10A is a view showing an example of the operation of the PC 2 in the test support system 100 of FIG. 2, showing a display pattern of an object to be edited inside a screen view window 54;

FIG. 10D is a view showing part of FIG. 10A, showing a detailed example of a screen view window 54;

FIG. 13A is a view showing an example of the operation of the PC 2 in the test support system 100 of FIG. 2, showing a dialog screen as an object to be edited inside the screen view window 54;

FIG. 13E is a view showing a part of FIG. 13A, showing an example of a screen view window 54.

FIG. 17B is a view showing a part of FIG. 17A, showing an example of a screen property window 53.

FIG. 17C is a view showing a part of FIG. 17A, showing a detailed example of a property edition screen 160.

FIG. 19B is a view showing a part of FIG. 19A, showing an example of a unit result window.

FIG. 19C is a view showing a part of FIG. 19A, showing a detailed example of a property edition screen 170.

FIG. 21B is a view showing a part of FIG. 21A, showing an example of a unit result window.

FIG. 22 is a block diagram showing a configurational example of the PC 2 in the test support system 100 of FIG. 2, showing an example of a functional configuration of an editor.

DETAILED DESCRIPTION OF THE PREFERRED EMBODIMENTS

Test Support System

Figure 1:
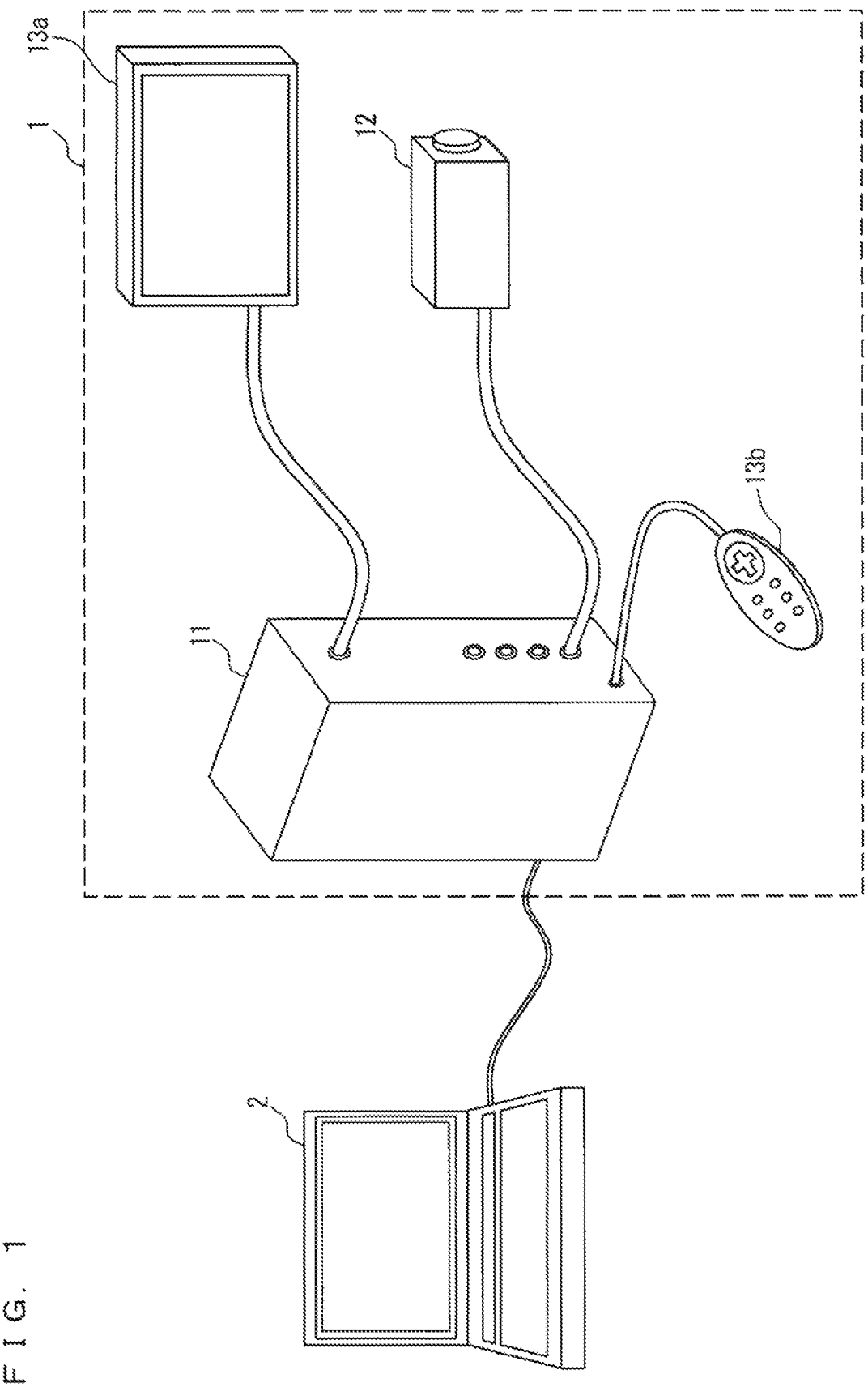
FIG. 1 is a perspective view showing a configurational example of a test support system including a program creation apparatus according to an embodiment of the present invention.

FIG. 1 is a perspective view showing a configurational example of a test support system including a program creation apparatus according to an embodiment of the present invention. This test support system includes an image processing apparatus 1 arranged on a conveyance line for an object to be tested, and a PC (personal computer) 2 which generates a control program for the image processing apparatus 1.

The image processing apparatus 1 includes an image processing controller 11, a camera 12, a display 13a, and an operational unit 13b, and is a sensor apparatus which outputs a determination signal based upon a camera image obtained from an object to be tested. This determination signal is inputted into a not shown PLC (Programmable Logic Controller) or the like and the image processing apparatus 1 is used as a FA (Factory Automation) sensor.

The camera 12 is an image-pickup device which photographs an object to be photographed, generates image data, and outputs the data as a camera image, and is detachably connected to the image processing controller 11. The camera 12 is arranged above the conveyance line along which the object to be tested is conveyed, and the object to be tested is photographed as the object to be photographed.

The display 13a is an output device for displaying a camera image obtained by photographing the object to be tested and an image processing result based upon the camera image. This display 13a is display-controlled by the image processing controller 11, and typically arranged in proximity to the image processing controller 11. That is, the display 13a is a display device for allowing a user to check an operating state of the image processing controller 11 in a case of the image processing controller 11 being in operation. The operational unit 13b is an input device for shifting a focus position and selecting a menu item on the display 13a.

The image processing controller 11 is a body unit of the image processing apparatus 1 which captures a camera image from the camera 12 and outputs, as a processing result a determination signal indicating a determination result based upon the camera image.

This image processing controller 11 is connected with four cameras 12 at the maximum, and based upon camera images obtained from these cameras 12, image processing is performed. A determination signal outputted from the image processing controller 11 is generated as a signal indicating a determination result about the quality of a product, or the like.

Further, this image processing controller 11 is connected with the display 13a and the operational unit 13b, and even not connected with the PC 2, the image processing controller 11 is capable of making the display 13a and the operational unit 13b operate respectively as the output device and the input device.

The PC 2 is a program creation apparatus which creates a control program for the image processing controller 11, and generates a control program by means of an editor (software) operated on the PC 2. At the time of creating the control program for the image processing controller 11, the program can be simulated on the PC 2 for checking its operation.

In the PC 2, layout information for definition of a display mode on the display 13a by the image processing controller 11 is created. This layout information is also created on the edition screen in the PC 2 by means of the editor, and test setting data including the control program and the layout information is generated.

The PC 2 and the image processing controller 11 of the image processing apparatus 1 are connected with each other through a communication network such as Ethernet (registered trademark) or the like. The PC 2 is detachably connected with a plurality of image processing controllers 11. The test setting data created on the PC 2 is transferred to the image processing controller 11 so that the test setting data inside the image processing controller 11 can be rewritten. Further, the test setting data inside the image processing controller 11 can be captured and edited on the PC 2. This PC 2 is typically connected with the image processing controller 11 in maintenance of the image processing apparatus 1.

<System Configuration>

Figure 2:
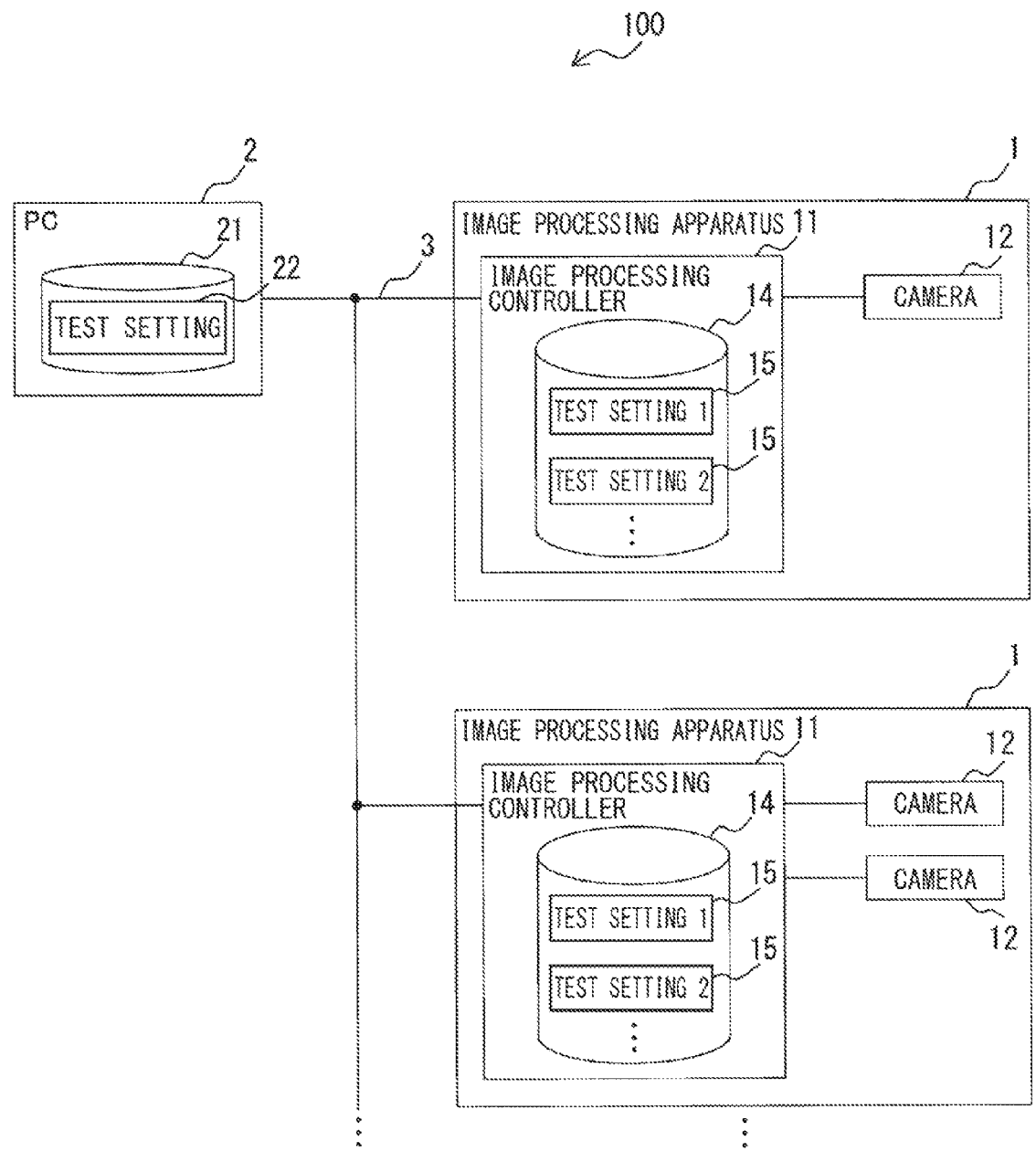
FIG. 2 is a block diagram showing an example of a system configuration of the test support system of FIG. 1.

FIG. 2 is a block diagram showing an example of a system configuration of the test support system of FIG. 1. This test support system 100 is configured by one PC 2 and a plurality of image processing apparatuses 1 connected to the PC 2 through a communication network 3. A control program and layout information created on the PC 2 are stored inside a memory 21 as test setting data 22.

The test setting data 22 created on the PC 2 is transferred to the image processing controller 11 through the communication network 3. At this time, specifying a transfer destination and transferring the test setting data 22 can update test setting data 15 inside a memory 14 or add new test setting data inside the memory 14 in a desired image processing controller 11.

In this image processing controller 11, a plurality of test setting data 15 are held inside the memory 14 such as a flash memory. Each test setting data 15 includes control programs with different processing procedures or test contents, and the test setting data 15 as an object to be executed can be changed based upon a user's operation.

In the PC 2, an operation is performed to obtain the test setting data 15 from the image processing controller 11 connected through the communication network 3, and edit the obtained data.

<Editor Screen>

Figure 3:
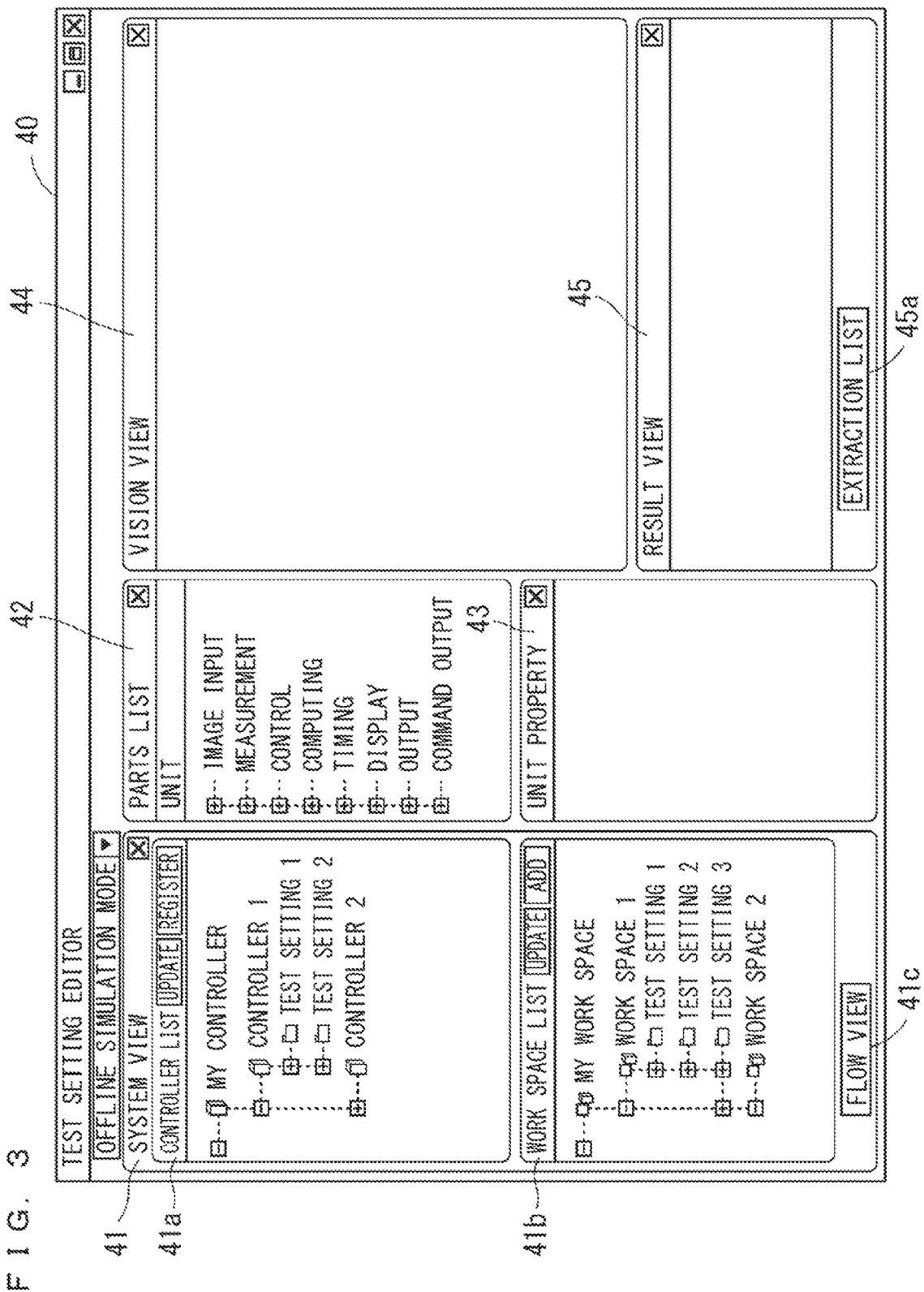
FIG. 3 is a view showing an example of an operation of a PC 2 in a test support system 100 of FIG. 2, showing an editor screen 40 for creating test setting data 22.

FIG. 3 is a view showing an example of an operation of the PC 2 in the test support system 100 of FIG. 2, and shows an editor screen 40 for creating the test setting data 22. The editor screen 40 is an edition screen for newly creating test setting data on the PC 2, or editing test setting data obtained from the image processing controller 11, and the editor screen 40 is displayed on the PC 2.

This editor screen 40 includes a plurality of screens, whose display positions and display ranges are changeable respectively. Specifically, the editor screen 40 includes a system view window 41, a parts-list window 42, a unit property window 43, a vision view window 44, and a result view window 45.

The system view window 41 is a window screen for list-displaying system configurations and test setting data as objects to be edited, and includes a controller list screen 41a and a work space list screen 41b.

The controller list screen 41a is a screen for list-displaying the image processing controllers 11 connected to the PC 2, and displays icons indicating the image processing controllers 11 and icons indicating the test setting data 15 held inside the image processing controllers 11.

The respective icons indicating the image processing controllers 11 and the test setting data 15 are displayed in tree form. Namely, the icons are displayed with the image processing controller 11 taken as an upper hierarchical layer and the test setting data 15 held inside the image processing controller 11 taken as a lower hierarchical layer, such that which image processing controller 11 holds each test setting data 15 is identifiable.

The work space list screen 41b is a screen for list-displaying test setting data as an object to be edited, and displays an icon indicating an operational region on the memory 21 provided in each image processing controller 1, and an icon indicating the test setting data. The operational region on the memory 21 is associated with the corresponding image processing controller 11, and is displayed as a work space. That is, the test setting data is held in each image processing controller 11, and edition is performed in the work space in each image processing controller 11.

The icons respectively indicating operational regions and the test setting data as thus described are displayed in tree form. Namely, the icons are displayed with the work space corresponding to the image processing controller 11 taken as an upper hierarchical layer and the test setting data inside this work space taken as a lower hierarchical layer, such that in which work space each test setting data is present is identifiable.

When an update button (icon) arranged in a heading area of the controller list screen 41a is operated, test setting data is newly obtained from the image processing controller 11, and the test setting data and the system configuration held on the PC 2 are updated to new ones. Further, when a registration button is operated, the test setting data created on the PC 2 is transferred to the image processing controller 11.

When an update button (icon) arranged in a heading area of the work space list screen 41b is operated, test setting data as an object to be edited is updated by test setting data obtained from the image processing controller 11. Further, when an addition button is operated, a new operational region is provided, and an icon indicating test setting data is added.

The parts-list window 42 is a window screen for displaying, as a unit list, processing units selectable at the time of creating test setting data. The processing unit is a symbol showing processing in which a parameter is changeable. As the processing units, provided are an image processing unit showing image processing, an image pick-up unit showing image pick-up processing, a control unit showing flow control processing, an output unit showing output processing, and the like. Arranging such a processing unit on a flowchart inside a later-described flow view window can create a control program including a desired flow sequence.

A plurality of processing units are displayed inside the parts-list window 42. In this example, the processing units are segmented into eight categories depending upon kinds of processing, and icons indicating the respective categories are displayed. Specifically, the processing units are segmented into categories of "image input", "measurement", "control", "computing", "timing", "display", "output", and "command output".

"Image input" is a category to which a processing unit concerning image pick-up belongs, and an image pick-up unit that captures a camera image belongs to this category. The image pick-up unit is associated with parameters for specifying a shutter speed, camera sensitivity flash delay time, flash-on time, a camera as an object for image pick-up, a flash terminal, and a trigger terminal, as properties.

"Measurement" is a category to which a processing unit concerning measurement belongs, and image processing units such as a pattern search unit, an edge position detection unit, a blob detection unit, a color test unit, and a flaw detection unit belong to this category.

Pattern search is processing for scanning the inside of a search region on a camera image, to detect a position consistent with a previously registered pattern image. Edge position detection is processing for obtaining an average concentration in a direction vertical to a detection direction in a measurement region on the camera image, to detect a position of an edge from a change in concentration in the detection direction.

Blob detection is processing for binarizing a camera image and extracting a lump of pixels having the same concentration as blobs, to detect the number, an area and a barycentric position of blobs present inside the measurement region. A color test is processing for measuring a color inside a test region, and a numerical value corresponding to the color is extracted as a measurement result.

Flaw detection is processing for detecting a flaw or a stain on the object to be tested from a difference in concentration between adjacent image regions. Specifically, while a segment (small region) inside the measurement region on the camera image is shifted in a prescribed detection direction, an average concentration inside the segment is measured every time of the shift by a fixed amount. Then, a maximum concentration and a minimum concentration of each of a prescribed number of segments including an attention segment, which are adjacent to one another in the detection direction, are determined so as to calculate, from differences among these concentrations, a flaw level of the attention segment. This flaw level is compared with a prescribed threshold value, and based upon this comparison result, positions and the number of flaws are determined.

In the image processing concerning the measurement as thus described, a shape and a size of the object to be tested, a position of the object to be tested inside a camera image, and the like is detected, and the measurement value is outputted as an image processing result. Further, the measurement value is compared with a parameter previously specified by the user, and based upon this comparison result, the quality of the object to be tested, such as presence or absence of deficiency or abnormality, is determined and the determination result is outputted as an image processing result. Further, a camera image, embedded with a symbol graphically indicating a measurement region, a detected position of the object to be tested, and the like, is created and outputted as an image processing result.

"Control" is a category to which a processing unit concerning control belongs, and control units such as a repeat unit, a bypass unit, and an end symbol unit belong to this category. The repeat unit is a processing unit including a repeat start unit that shows a start point for the time of repetition of an execution flow, and a repeat end unit that shows an end point for the same, and the unit shows processing for repeating the execution flow between the start unit and the end unit until a prescribed condition is satisfied.

The bypass unit is a processing unit including a branching unit that branches the execution flow into two branch flows and a converging flow that converges the branch flows branched by the branching unit, and the unit shows processing for branching the execution flow under a prescribed condition. The end symbol is a display object for completing one flow sequence.

"Computing" is a category to which a processing unit concerning computing belongs, and image processing units such as a numerical value computing unit and a position correction unit belong to this category. "Timing" is a category to which a processing unit concerning a flow-shift stopping operation belongs, and control units such as a wait unit and an event wait unit belong to this category. The wait unit shows processing for stopping the flow shift just for a prescribed period of time. The event wait unit shows processing for stopping the flow shift until a terminal input or a variable value comes into a prescribed condition.

"Display" is a category to which a processing unit concerning display belongs, and an image processing unit such as a graphic display belongs to this category. The graphic display unit shows processing for referencing another processing unit and graphically displaying a processing result of the referenced processing unit.

"Output" is a category to which a processing unit concerning output belongs, and output units such as a terminal output unit, a result output unit and an image output unit belong to this category. The terminal output unit is associated with parameters for specifying a reference destination unit, a determination result, and an output destination terminal for a determination result, as properties. The result output unit is associated with parameters for specifying a reference destination unit, numerical value data showing a processing result, a data form (text form or binary form) when outputting numerical value data, and an output destination for numerical value data, as properties. The image output unit is associated with parameters for specifying a reference destination unit, a camera image, a data form when outputting image data, and an output destination for image data, as properties.

"Command output" is a category to which a processing unit concerning display belongs, and output units such as a command issue unit, a display pattern switch unit and a dialog display unit belong to this category. The command issue unit shows processing for issuing a command such as registering of an image, switching of a test setting, or resetting.

The display pattern switch unit is a processing unit that switches a display pattern displayed on the display 13a of the image processing apparatus 1, and outputs a command for switching the display pattern. The display pattern includes arrangement information of a display component which is used at the time of displaying on the display 13a a display component, such as a camera image display component for displaying a camera image or a measurement result display component for displaying a measurement result. That is, since having a display pattern including arrangement information of a display component, the display pattern switch unit is a component arrangement switch unit that changes an arrangement condition of a display component on the display 13a.

Here, the camera image display component for displaying a camera image is referred to as a screen component, and the measurement result display component for displaying a measurement result is referred to as a result component.

The dialog display unit is a processing unit that makes a dialog screen for an operational input displayed on the display 13a, and makes a command for displaying the dialog screen outputted. The dialog screen includes arrangement information of dialog components such as an input component for inputting a parameter of a processing unit and an operation component for displaying another dialog screen.

Such dialog display units include a dialog wait unit which stops a flow shift, and a unit which does not stop the flow shift. The dialog wait unit is a control unit that stops the flow shift until input of a parameter is completed in a case where the dialog screen is displayed on the display 13a.

The unit property window 43 is a window screen for displaying a property of a processing unit selected on the controller list screen 41a, the work space list screen 41b or the flow view window.

The vision view window 44 is a window screen for displaying a camera image associated with the processing unit selected on the controller list screen 41a, the work space list screen 41b or the flow view window.

The result view window 45 is a window screen for displaying a parameter of the processing unit selected on the controller list screen 41a, the work space list screen 41b or the flow view window, and a simulation result.

On this editor screen 40, when a flow view button 41c arranged in a lower portion of the system view window 41 is operated, the flow view window can be displayed in place of the foregoing system view window 41. The flow view window is a window screen that displays as a flowchart a processing procedure to be executed by the image processing controller 11, and displays test setting data selected on the work space list screen 41b.

Further, when an extraction list button 45a arranged in the lower portion of the result view window 45 is operated, an extraction list window can be displayed in place of the result view window 45. The extraction list window is a window screen for extracting a parameter selected on the result view window 45 and a processing result and list-displaying an extraction result per each processing unit.

<Flow View Window>

Figure 4:
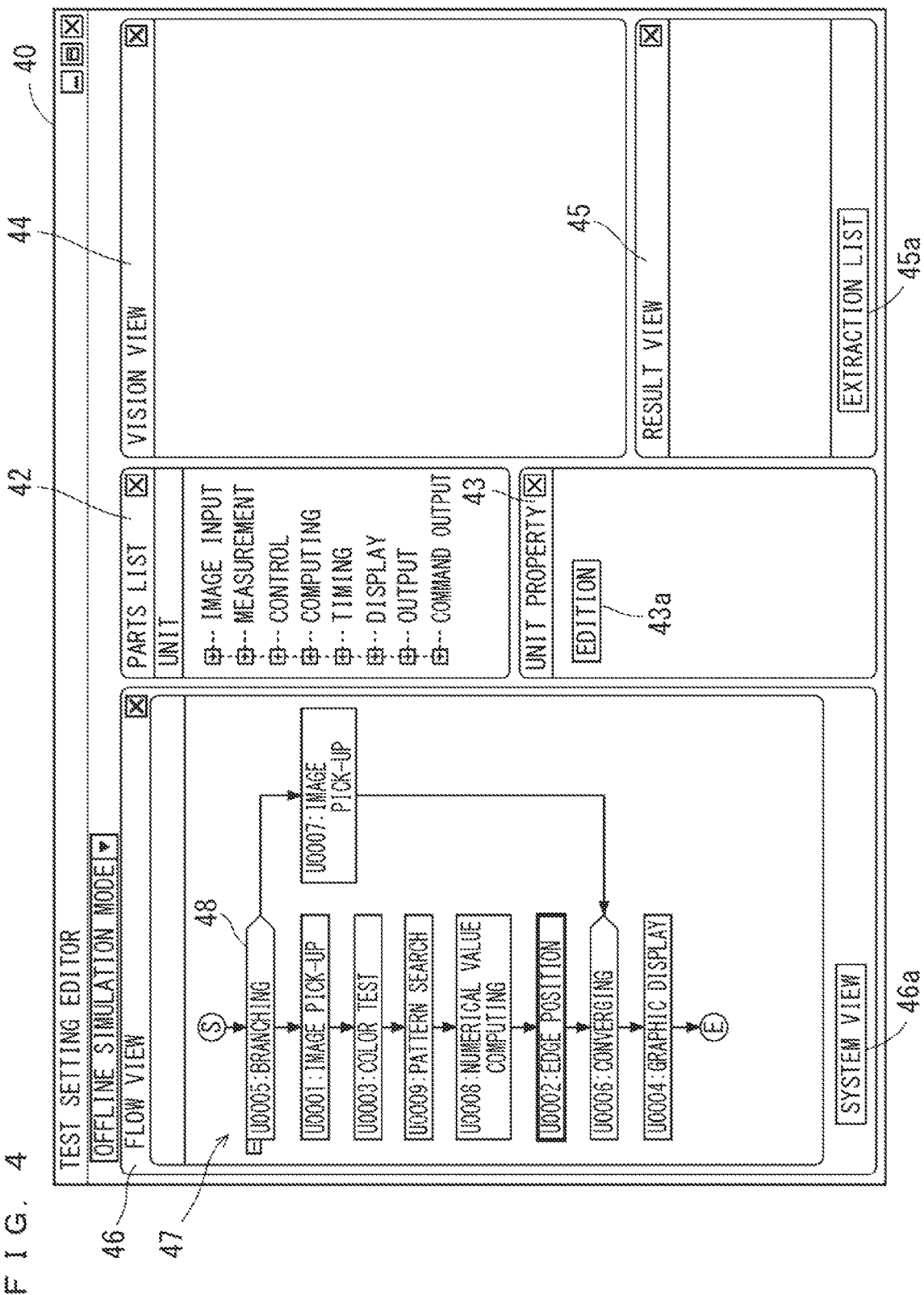
FIG. 4 is a view showing an example of the operation of the PC 2 in the test support system 100 of FIG. 2, showing the editor screen 40 where a flow view window 46 is displayed.

FIG. 4 is a view showing an example of the operation of the PC 2 in the test support system 100 of FIG. 2, and shows the editor screen 40 where a flow view window 46 is displayed. The flow view window 46 is a window screen that displays a flowchart 47 showing a processing procedure in order to newly create a control program of test setting data or edit a control program obtained from the image processing controller 11.

On the flow view window 46, a flowchart 47 configured by arraying a plurality of processing units 48 is displayed. In the flowchart 47 represented is a processing unit executed in a time-series manner on an execution flow that is started with a start symbol "S" and completed with an end symbol "E". The user can arrange the processing unit 48 on such an execution flow so as to configure a desired control program.

That is, a series of image processing to be performed by the image processing controller 11 is blocked as a processing unit, and the user can only arrange a processing unit on the execution flow inside the flow view window 46 so as to create a flow sequence in which the processing unit performs prescribed processing based upon a processing result of a processing unit immediately before this processing unit.

When a system view button 46a arranged in the lower portion of the flow view window 46 is operated, the system view window 41 can be displayed in place of the flow view window 46.

The processing unit being selected on the flow view window 46 is focus-displayed, and its property is displayed inside the unit property window 43. An edition button 43a is arranged inside the unit property window 43, and when the edition button 43a is operated, a property edition screen for editing a property of a processing unit is displayed. The property edition screen is an edition screen for specifying a parameter of a processing unit based upon a user operation or changing an already specified parameter.

<Edition Screen of Layout Information>

Figure 5:
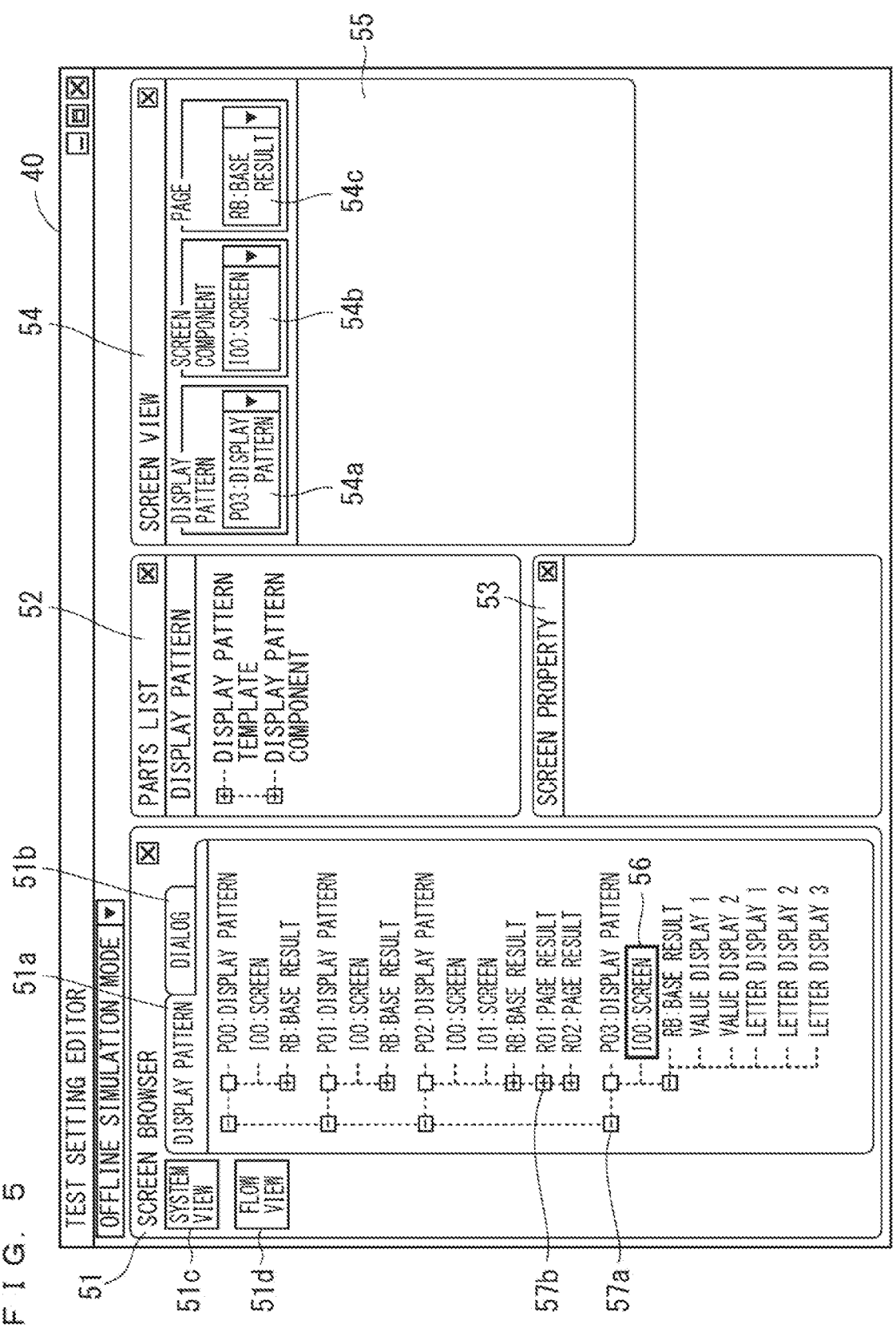
FIG. 5 is a view showing an example of the operation of the PC 2 in the test support system 100 of FIG. 2, showing an editor screen 40 at the time of editing layout information.

FIG. 5 is a view showing an example of an operation of the PC 2 according to the test support system 100 of FIG. 2, and shows the editor screen 40 at the time of editing layout information. On this editor screen 40, a screen browser screen 51, a parts-list window 52, a screen property window 53, and a screen view window 54 are displayed.

The screen browser screen 51 is a window screen that displays layout information of test setting data selected as an object to be edited for newly creating layout information or editing layout information obtained from the image processing controller 11.

The layout information is information for defining a display mode on the display 13a of the image processing apparatus 1, and is configured by a plurality of different display patterns associated with a control program belonging to the same test setting data, and one or more than one dialog screens.

The display pattern includes arrangement information showing display modes at the time of displaying a camera image and a measurement value on the display 13a, and is formed by arranging display components on the screen view window 54. As the display components, provided are a screen component for displaying a camera image, a result component for displaying a measurement value, a letter component for displaying letters, a built-in component for displaying the number of measurements and measured date and time, and the like.

The dialog screen is a window screen displayed on the display 13a. As the dialog screens, provided are an input dialog where an input component for inputting a parameter of a processing unit is arranged, an operation dialog where an operation component for displaying another dialog screen is arranged, and the like.

This screen browser screen 51 is provided with a display pattern tab 51a and a dialog tab 51b, and these tabs are operated so as to selectively display either a list of display pattern data or a list of dialog screen data. This figure shows a case where a list display of the display pattern data has been selected by an operation of the display pattern tab 51a.

In the list display of the display pattern data, icons respectively indicating display patterns held on the PC 2 as test setting data each selected as an object to be edited and display components constituting these display patterns. On the screen browser screen 51, a plurality of different switchable display patterns are displayed.

The respective icons indicating the display patterns and the display components are displayed in tree form. Namely, the icons are displayed with the display pattern taken as an upper hierarchical layer and the display component taken as a lower hierarchical layer, such that to which display pattern each display component belongs is identifiable.

Each display pattern includes a screen component, a base result frame configured by a built-in component and the like, and a page result frame configured by a letter component and the result component. A plurality of page result frames are associated with the same display pattern so as to form a display pattern including a plurality of page frames provided with the common screen component. The page frames displayed on the display 13a can be switched by the operation of the display 13a.

In this list display of the display pattern data, an icon selected as an object to be edited is subjected to focus-display 56. Further, a folding icon 57a is arranged on the icon indicating the display pattern or the base result frame. This folding icon 57a is an icon for folding the lower hierarchical layer, and when the icon is operated using a mouse pointer or the like, the display component constituting the display pattern or the base result frame can be brought into a non-display state. Further, a development icon 57b arranged on the icon indicating the page result frame or the like is an icon for developing the lower hierarchical layer, and when the icon is operated using the mouse pointer or the like, the display component brought into the non-display state can be displayed.

On this editor screen 40, when a system view button 51c arranged inside the screen browser screen 51 is operated, the system view window 41 can be displayed in place of the screen browser screen 51. Further, when a flow view button 51d is operated, the flow view window 46 can be displayed in place of the screen browser screen 51.

The parts-list window 52 is a window screen for list-displaying display patterns and display components that can be selected at the time of creating test setting data. Inside this parts-list window 52, displayed are an icon indicating a display pattern previously created as a template and an icon indicating a display component. Arranging a display component inside the parts-list window 52 on the screen view window 54 can form a desired display pattern.

The screen property window 53 is a window screen for displaying a property of an object to be edited, selected on the screen browser screen 51.

The screen view window 54 is a window screen for displaying an object to be edited, selected on the screen browser screen 51, and a display pattern including an object to be edited is displayed inside a display region 55. Inside this screen view window 54, displayed are a change button 54a for changing a display pattern, a change button 54b for changing a screen component, and a change button 54c for changing a page frame.

The change button 54a is an input button for changing a display pattern as an object to be edited. When this change button 54a is operated, selectable display patterns are list-displayed, and selecting any of these display patterns can make a desired display pattern displayed inside the display region 55 as an object to be edited.

The change button 54b is an input button for changing a screen component as an object to be edited. When this change button 54b is operated, selectable screen components are list-displayed, and selecting any of these display patterns can make a desired screen component displayed inside the display region 55 as an object to be edited. The change button 54c is an input button for changing a page frame as an object to be edited. When this change button 54c is operated, the selectable page frames are list-displayed, and selecting any of these page frames can make a desired page frame displayed inside the display region 55 as an object to be edited.

Figure 6:
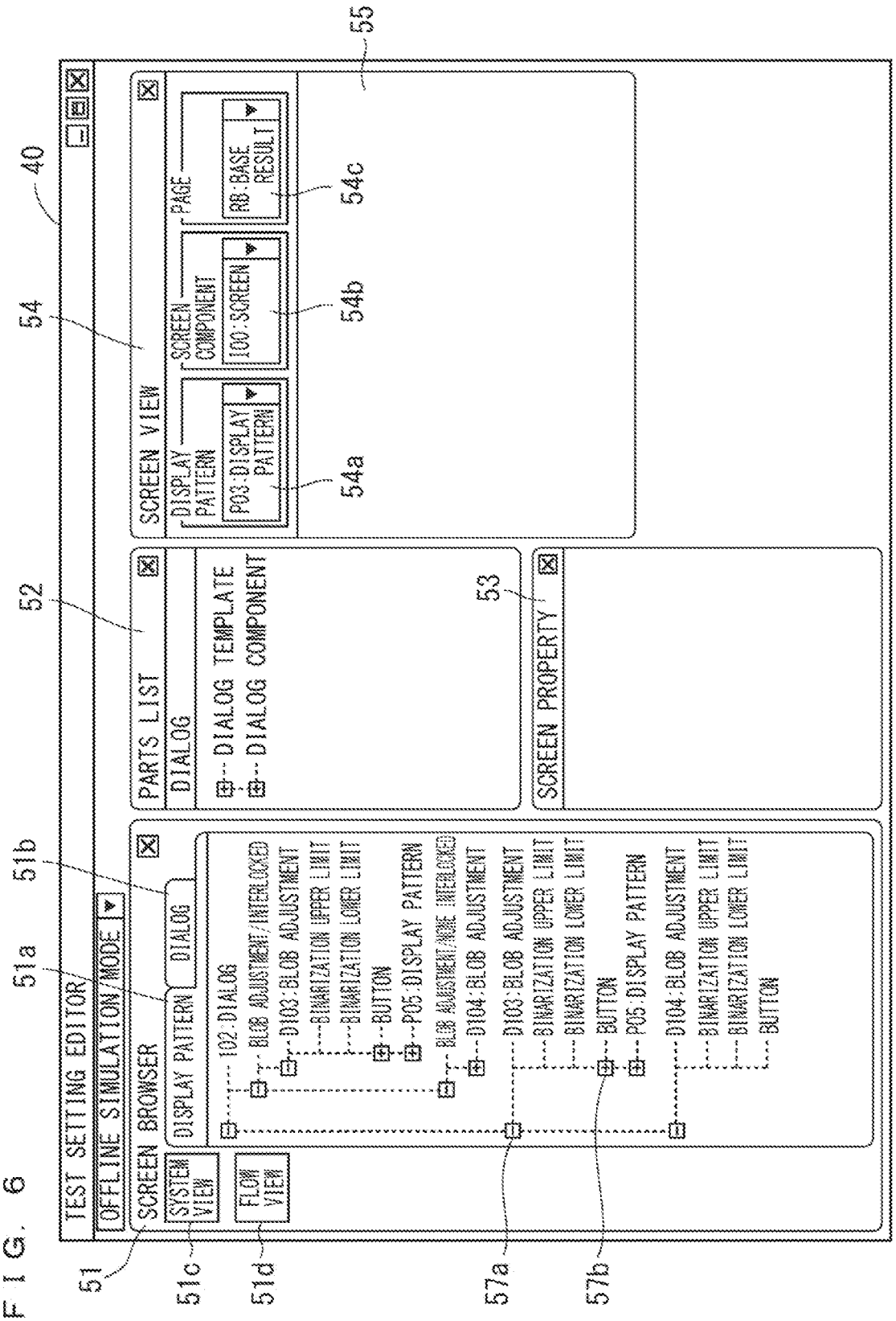
FIG. 6 is a view showing an example of the operation of the PC 2 in the test support system 100 of FIG. 2, showing the editor screen 40 where dialog screen data is displayed.

FIG. 6 is a view showing an example of the operation of the PC 2 in the test support system 100 of FIG. 2, and shows the editor screen 40 where dialog screen data is displayed inside the screen browser screen 51.

In a list display of the dialog screen data, icons respectively identifying one or more than one dialog screens held on the PC 2 as test setting data selected as objects to be edited, dialog components (operation components and input components) constituting these dialog screens, and display patterns associated with the dialog screens are list-displayed.

The respective icons indicating the dialog screens, the operation components, the input components and the display patterns are displayed in tree form. Namely, the icons are displayed with the dialog screen taken as an upper hierarchical layer and the operation component and the input component constituting this dialog screen taken as a lower hierarchical layer, such that to which dialog screen each operation component and each input component belongs is identifiable.

As the dialog screens, provided are an input dialog where an input component for inputting a parameter of a processing unit is arranged and an operation dialog where an operation component that makes another dialog screen displayed.

In the list display of the dialog screen data on this screen browser screen 51, an icon indicating another dialog screen, associated with a dialog screen so as to be displayed by operation of an operation component, is displayed as the lower hierarchical layer than an icon indicating the operation component. Further, an icon indicating a display pattern, associated with a dialog screen so as to switch a display pattern displayed on the display 13a at the time of displaying the dialog screen, is displayed along with an operation component and an input component.

In the list display of the dialog screen data, an icon selected as an object to be edited is focus-displayed. Further, the folding icon 57a is arranged on the icon indicating the dialog screen or the operation component. This folding icon 57a is an icon for folding the lower hierarchical layer, and when the icon is operated using the mouse pointer or the like, the dialog component associated with the dialog screen or the operation component can be brought into a non-display state. Further, the development icon 57b arranged on the icon indicating the operation component or the like is an icon for developing the lower hierarchical layer, and when the icon is operated using the mouse pointer or the like, the dialog component brought into the non-display state can be displayed.

This parts-list window 52 is a window screen for list-displaying dialog screens and components that can be selected at the time of creating test setting data. Inside this parts-list window 52, an icon indicating a dialog screen previously created as a template and an icon indicating a dialog component are displayed. Arranging a dialog component inside the parts-list window 52 on the dialog screen displayed on the screen view window 54 can form a desired dialog screen.

<Flowchart>

Figure 7:
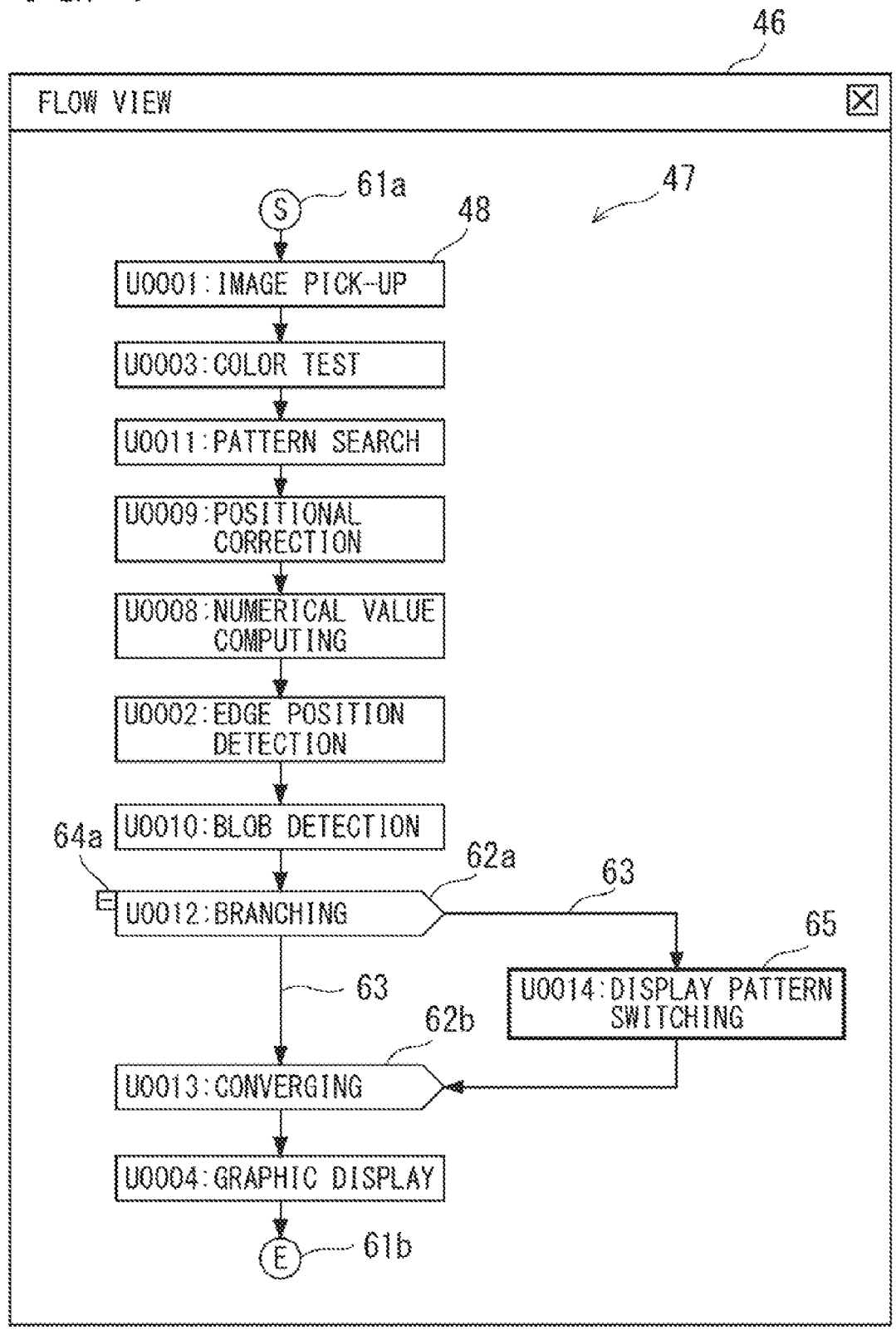
FIG. 7 is a view showing an example of the operation of the PC 2 in the test support system 100 of FIG. 2, showing an example of a flowchart 47 inside the flow view window 46.

FIG. 7 is a view showing an example of the operation of the PC 2 in the test support system 100 of FIG. 2, and shows an example of the flowchart 47 inside the flow view window 46. In this flowchart 47, a plurality of processing units 48 are arranged on an execution flow that is started with a start symbol 61a and completed with an end symbol 61b.

In a case of creating and editing the flowchart 47 on the flow view window 46, an operation is performed using the parts-list window 42. For example, in a case of inserting a processing unit into the flowchart 47, a desired processing unit is selected on the parts-list window 42, and a position for the selected unit on the execution flow is specified by the mouse pointer or the like, so that the processing unit is inserted.

In this example, the flowchart 47 is configured by arranging an image pick-up unit, a color test unit, a pattern search unit, a position correction unit, a numerical value computing unit, an edge position detection unit, a blob detection unit, a branching unit 62a, a converging unit 62b and a graphic display unit, in this order, on the execution flow.

The branching unit 62a and the converging unit 62b are control units constituting a bypass unit, and when the bypass unit is inserted onto the execution flow, the branching unit 62a and the converging unit 62b are always inserted in pair.

In this example, the execution flow from the blob detection unit is branched by the branching unit 62a into two branch flows 63, and the branch flows branched in the branching unit 62a is converged in the converging unit 62b. At that time, the one branch flow 63 directly reaches the converging unit 62b whereas the other branch flow 63 is a bypass channel (diversion) that reaches the converging unit 62b through the display pattern switch unit 65.

A folding icon 64a is arranged on the branching unit 62a and a repeat start unit 65a inside the flowchart 47. This folding icon 64a is an icon for displaying the flowchart 47 with the execution flow between the control units omitted, and is displayed adjacently to the processing unit.

Further, a processing unit selected on the flowchart 47 is focus-displayed, and can make a property of the processing unit displayed inside the unit property window 43, or change a property of the processing unit as an object to be edited.

The display pattern switch unit 65 inside this flowchart 47 is a component arrangement switch unit for changing an arrangement state of a display component on the display 13a, and makes a command for switching a display pattern outputted. This display pattern switch unit 65 is, for example, a processing unit that is arranged on the branch flow branched by the branching unit 62a and switches a display pattern to a previously associated display pattern at the timing of execution of the display pattern switch unit 65. In the branching unit 62a, a specific processing unit inside the flowchart 47 is previously specified as a reference destination for a determination result of the quality of an object to be tested, and the branch flow is selected based upon the determination result in the processing unit. Therefore, the display pattern is switched in a case of the display pattern switch unit 65 being arranged on the branch flow selected, based upon the determination result of the quality of the object to be tested, by the branching unit 62a.

Here, the example was described where a display pattern is switched in the case of the switch unit 65 being arranged on the branch flow selected by the branching unit 62a based upon the determination result of the quality of the object to be tested. However, the display pattern switch unit may be a processing unit that switches a display pattern based upon the determination result of the quality of the object to be tested. Namely, such a configuration may be considered that a determination result of the quality of the object to be tested in a specific processing unit inside the flowchart 47 is referenced, and based upon the determination result, it is decided whether or not to switch the display pattern.

As for switching of the display pattern by this display pattern switch unit 65, there are considered a case of switching a display pattern on display on the display 13a to a common control program, namely to any of a plurality of display patterns associated with the flowchart 47, and a case of switching the display pattern to a plurality of page frames where a common image screen components are arranged.

The methods for switching a reference destination for a processing result and a display pattern as thus described can be specified or changed on a property edition screen of the display pattern switch unit 65.

Figure 8:
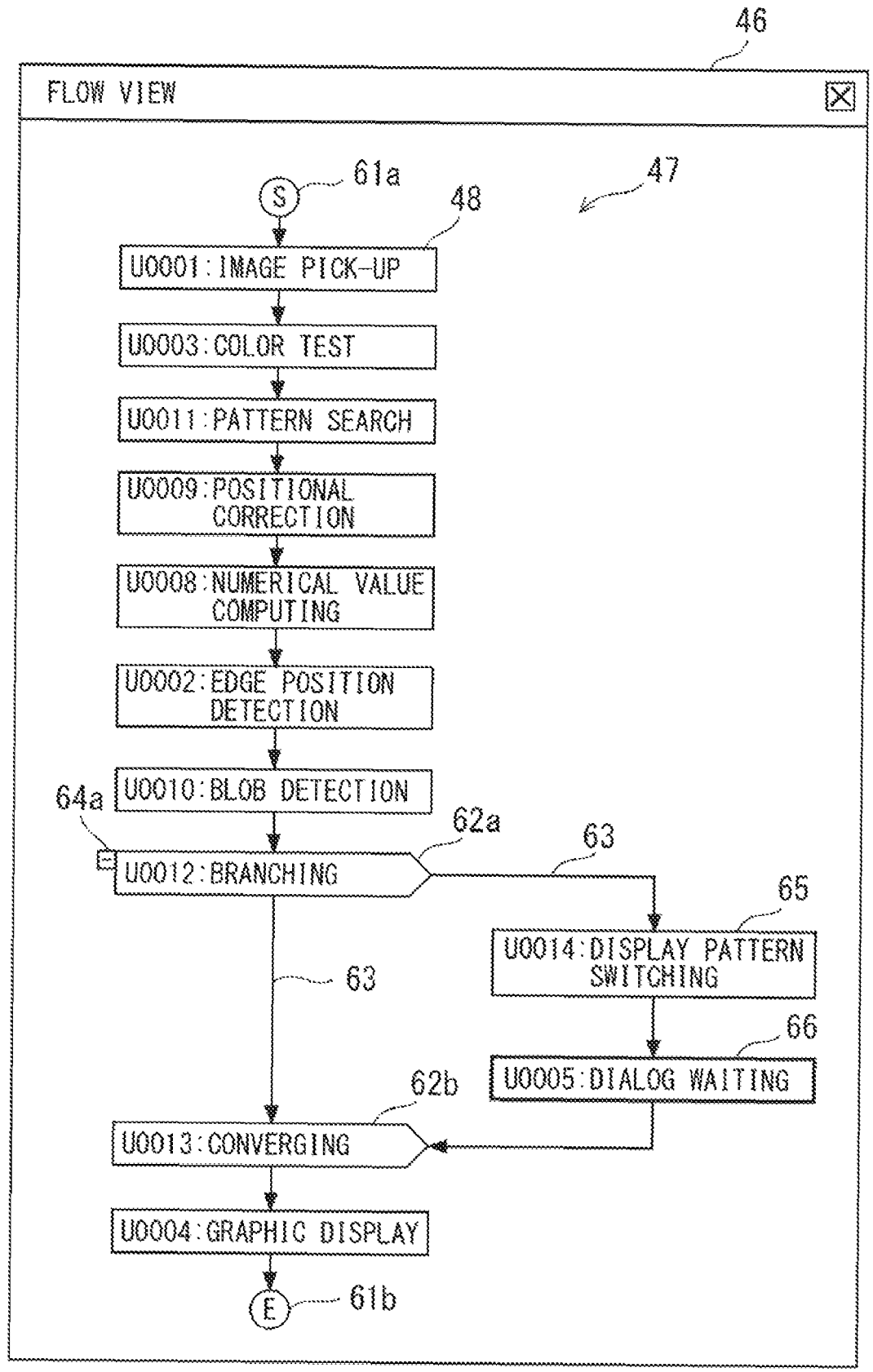
FIG. 8 is a view showing an example of the operation of the PC 2 in the test support system 100 of FIG. 2, showing the flowchart 47 where a dialog wait unit 66 is arranged.

FIG. 8 is a view showing an example of the operation of the PC 2 in the test support system 100 of FIG. 2, and shows an example of the flowchart 47 where a dialog wait unit 66 is arranged. As compared with the flowchart 47 of FIG. 7, this example is different in that the other branch flow 63 branched by the branching unit 62*a* reaches the converging unit 62*b* through the display pattern switch unit 65 and the dialog wait unit 66.

The dialog wait unit 66 inside the flowchart 47 is a processing unit that makes a dialog screen displayed on the display 13*a*, and also stops a flow shift until a parameter is inputted through an input component of the dialog screen, and makes a command for displaying a dialog screen outputted. This dialog wait unit 66 is, for example, a processing unit that is arranged on the branch flow branched by the branching unit 62*a* and displays a previously associated dialog screen at the timing of execution of the dialog wait unit 66. Therefore, the dialog screen is displayed in a case of the dialog wait unit 66 being arranged on the branch flow selected, based upon the determination result of the quality of the object to be tested, by the branching unit 62*a*.

Here, the example was displayed where a dialog screen is displayed in the case of the dialog wait unit 66 being arranged on the branch flow selected by the branching unit 62*a* based upon the determination result of the quality of the object to be tested. However, the dialog wait unit may be a processing unit that makes a dialog screen displayed based upon the determination result of the quality of the object to be tested. Namely, such a configuration may be considered that a determination result of the quality of the object to be tested in a specific processing unit inside the flowchart 47 is referenced, and based upon the determination result, it is decided whether or not to make the dialog screen displayed.

The reference destination for the processing result as thus described can be specified or changed on a property edition screen of the dialog wait unit 66.

<Property Edition Screen of Dialog Wait Unit>

Figure 9:
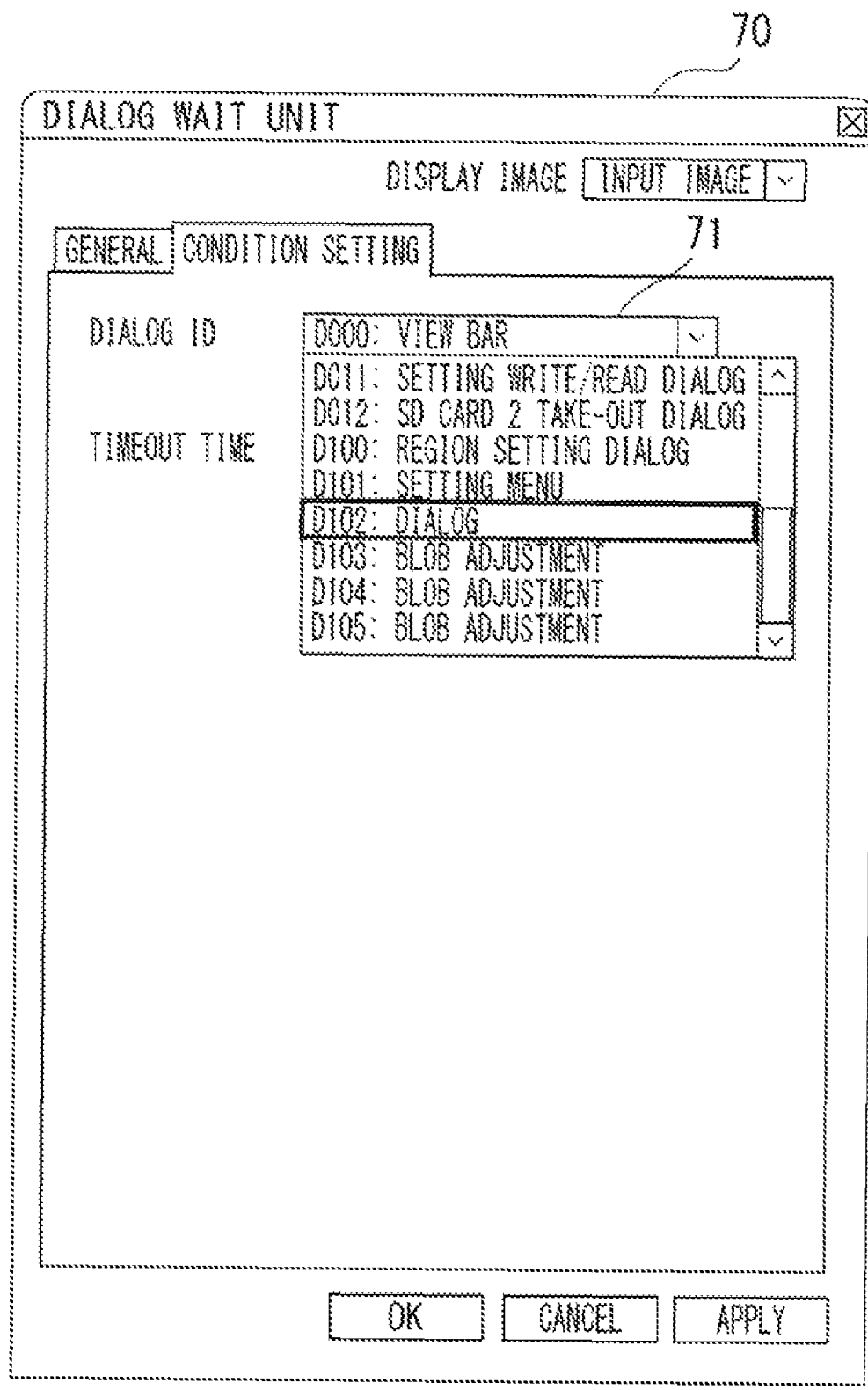
FIG. 9 is a view showing an example of the operation of the PC 2 in the test support system 100 of FIG. 2, showing a property edition screen 70 of the dialog wait unit.

FIG. 9 is a view showing an example of the operation of the PC 2 in the test support system 100 of FIG. 2, and shows a property edition screen 70 of the dialog wait unit displayed on the editor screen 40. This property edition screen 70 is a window screen for editing a property of the dialog wait unit.

This property edition screen 70 is provided with an input field 71 for specifying identification information of a dialog screen, and in the input field 71, identification information of dialog screens that can be associated are list-displayed. The user can select a desired dialog screen in the input field 71 so as to specify a dialog screen to be displayed at the time of executing the dialog wait unit.

<Display Pattern>

Figure 10B:
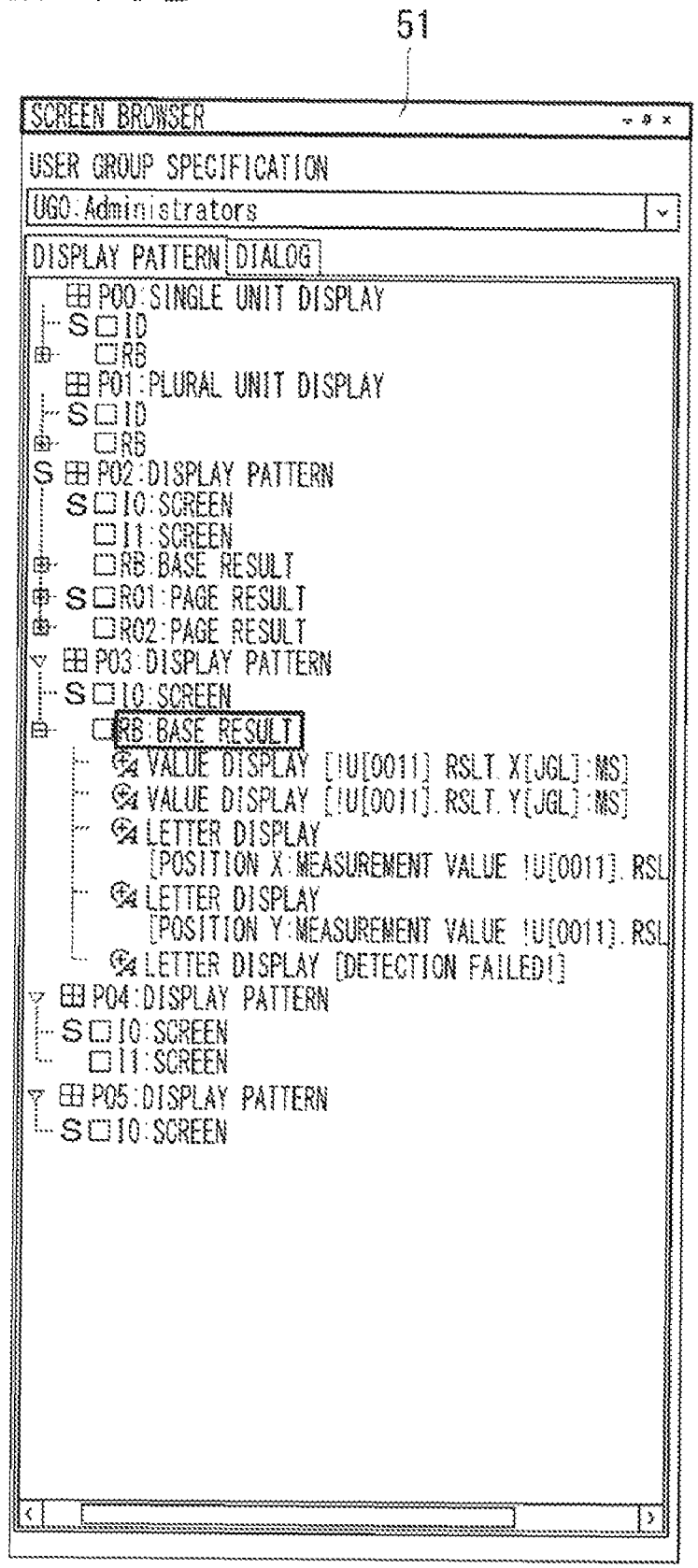
FIG. 10B is a view showing a part of FIG. 10A, showing a detailed example of a screen browser screen 51
Figure 10C:
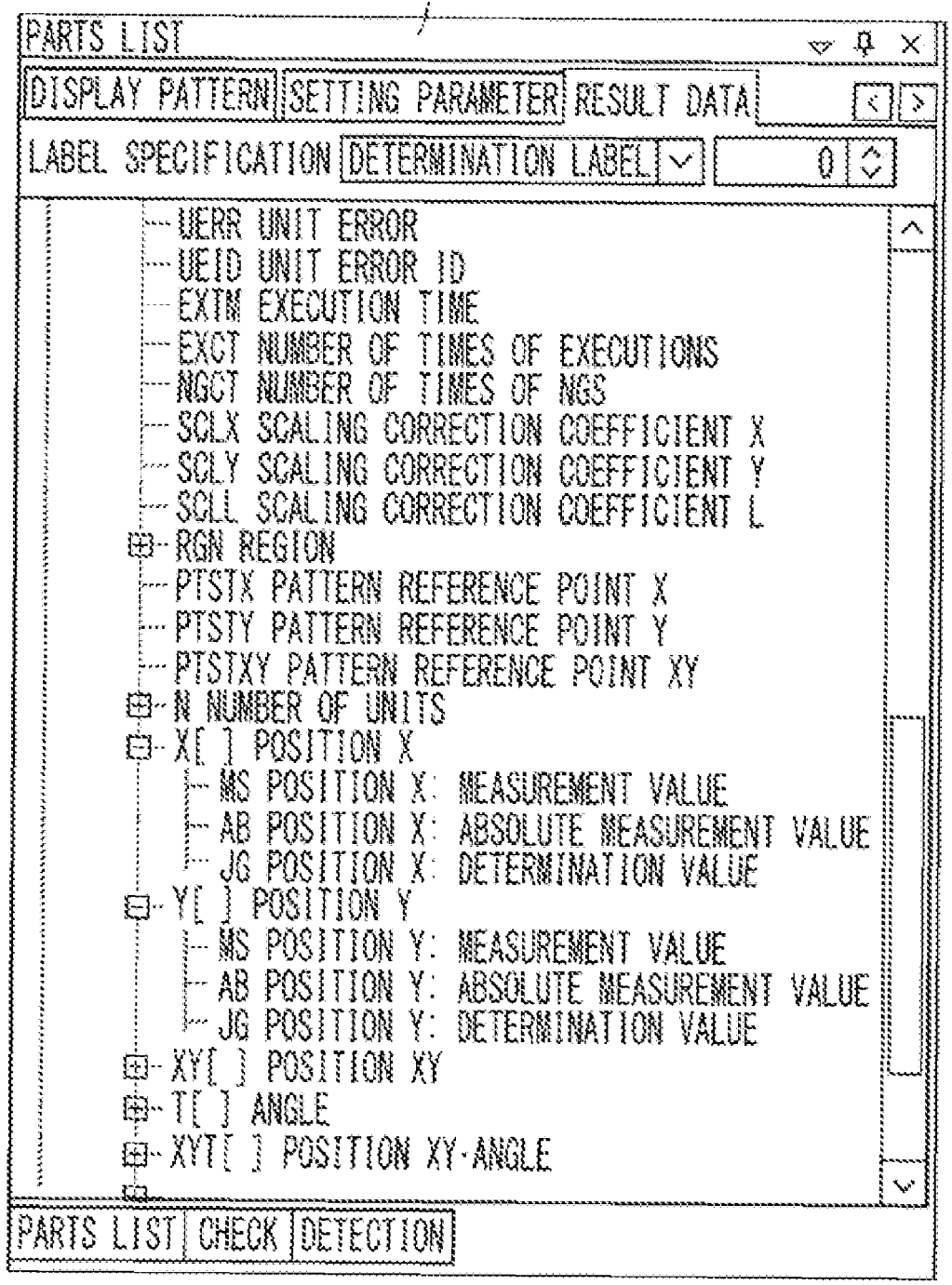
FIG. 10C is a view showing part of FIG. 10A, showing a detailed example of a Parts List 52.

FIG. 10A is a view showing an example of the operation of the PC 2 in the test support system 100 of FIG. 2, and shows the editor screen 40 where a display pattern of an object to be edited is displayed inside a screen view window 54. On this editor screen 40, a display pattern associated with an object to be edited selected on the screen browser screen 51 is displayed inside the display region 55 of the screen view window 54.

The display pattern includes arrangement information of a display component used at the time of displaying the display component on the display 13*a* of the image processing apparatus 1, and formed by the user arranging the display component inside the display region 55 of the screen view window 54.

In this example, the display pattern is configured by one screen component (camera image display component) 101, two result components (measurement result display components) 102, and three letter components 103.

The screen component 101 is a display component for displaying a camera image showing a processing result of a processing unit previously specified as a reference destination, and displays a camera image showing a measurement result by pattern search or the like. The result component 102 is a display component for displaying, as a measurement value, a processing result of a processing unit previously specified as a reference destination, and displays a measurement result by pattern search or the like. The letter component 103 is a display component for displaying a letter string specified by the user.

As for these display components 101 to 103, properties such as a position inside the display region 55, a size and a reference destination can be edited on the screen property window 53. The user can arrange a display component, selected inside the parts-list window 52, inside the display region 55 of the screen view window 54 and specify a property of the display component on the screen property window 53, to create a desired display pattern.

Accordingly a plurality of screen components and result components can be simultaneously displayed on the display 13*a* as display patterns, and by associating each of the components with an arbitrary processing unit a processing result of the processing unit can be displayed. Further, a layout used at the time of displaying a screen component or a result component on the display 13*a* can also be changed to a desired one.

<Screen Property Window>

Figure 11A:
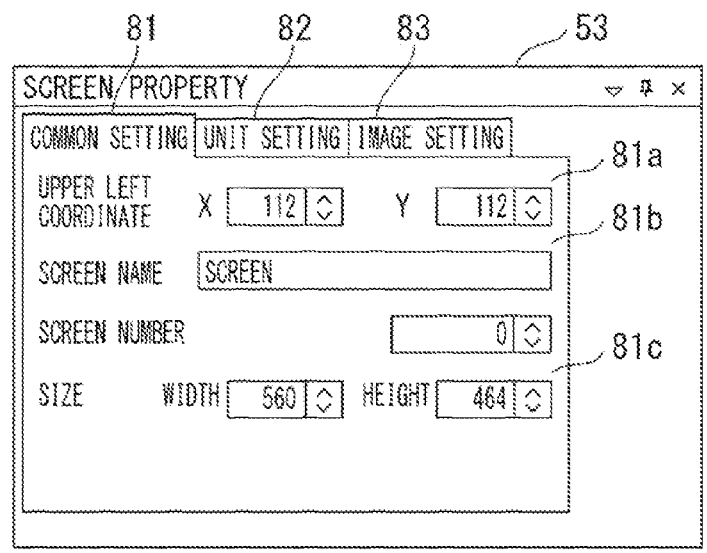
FIGS. 11A, 11B, and 11C are views each showing an example of the operation of the PC 2 in the test support system 100 of FIG. 2, showing a screen property window 53 at the time of editing a screen component.
Figure 11B:
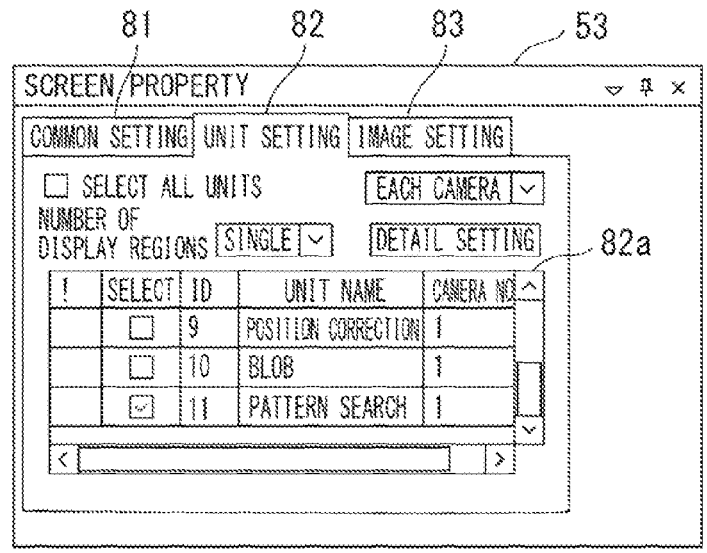
Figure 11C:
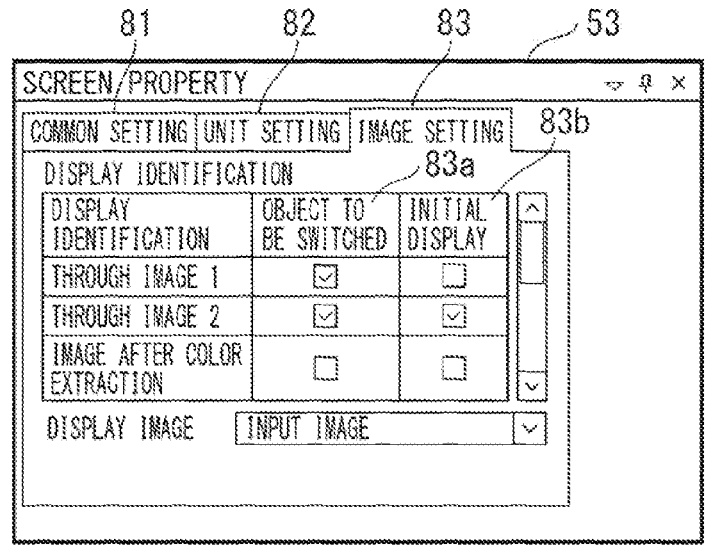

FIGS. 11A to 11C are views each showing an example of the operation of the PC 2 in the test support system 100 of FIG. 2, and show a screen property window 53 at the time of editing properties of a screen component. This screen property window 53 is a window screen for editing a property of an object to be edited selected on the screen browser screen 51 or the screen view window 54, and provided with tabs 81 to 83 for selecting any of common setting, unit setting and image setting.

FIG. 11A shows a case where an item of common setting was selected. In this common setting, a position and a size of the display component when displayed on the display 13*a* can be specified or changed. Specifically, an input field 81*a* for specifying a display position of the display component, an input field 81*b* for specifying identification information of the display component, and an input field 81*c* for specifying a display size are provided.

FIG. 11B shows a case where an item of unit setting was selected. In this unit setting, a processing unit that is associated as a reference destination for displaying a result of image processing can be specified or changed. In this example, an input field 82*a* for specifying a processing unit is provided, and in this input field 82*a*, processing units that can be selected as a reference destination are list-displayed.

FIG. 11C shows a case where an item of image setting was selected. In this image setting, a displaying method of a camera image can be specified or changed. In this example, input fields 83*a* and 83*b* for specifying the displaying method of the camera image are provided, and the camera images that can be selected as an object to be initially displayed or an object to be switched are list-displayed.

Further, as the displaying method of the camera image, an item of a through image or a filter image can be selected. The item of through image is a method for displaying a camera image before image processing (pre-processing) that is performed inside a measurement region for obtaining a measurement value. The filter image is a method for displaying a camera image after the image processing (pre-processing) performed for obtaining a measurement value.

<Expanded Display of Camera Image>

Figure 12:
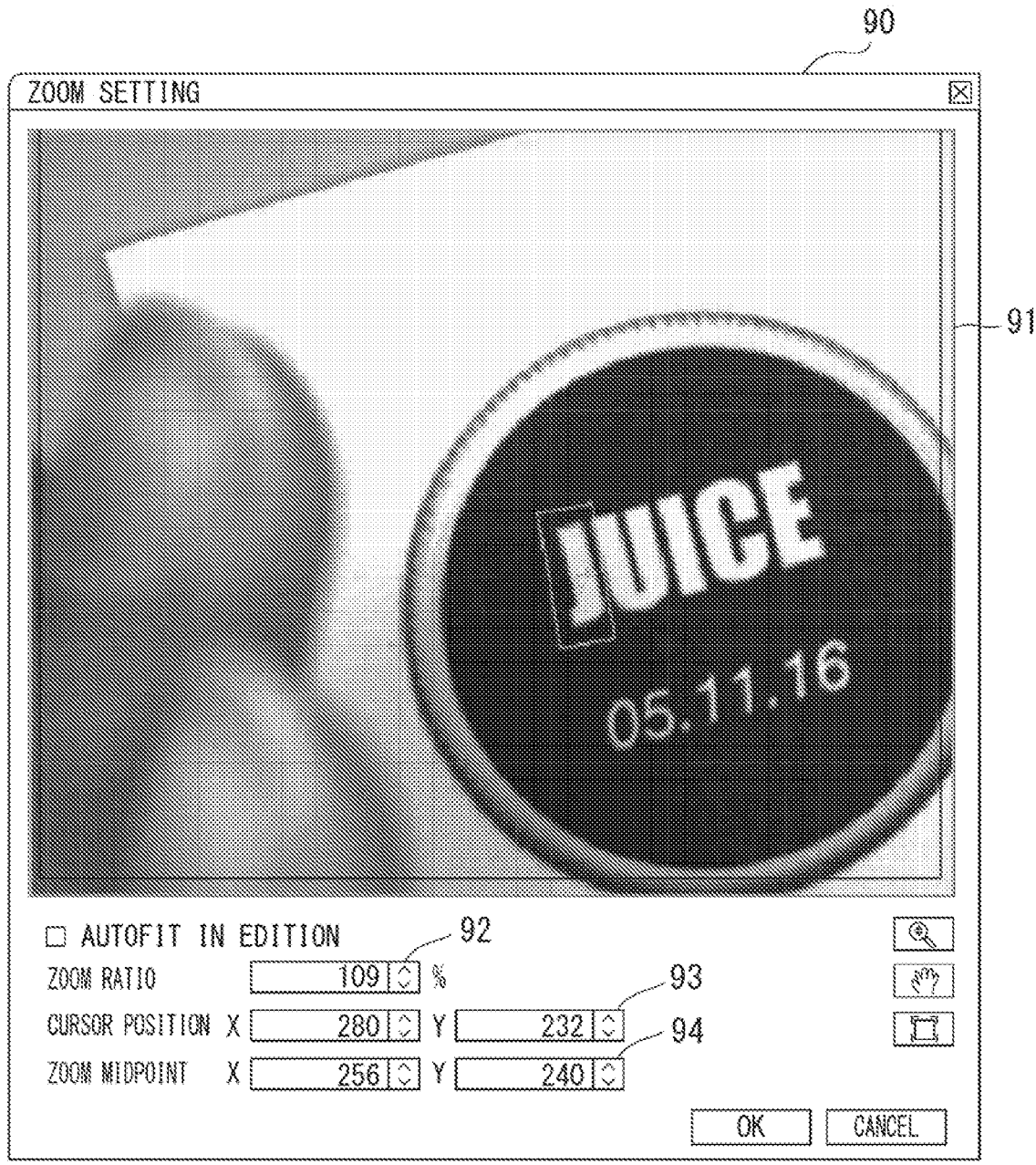
FIG. 12 is a view showing an example of the operation of the PC 2 in the test support system 100 of FIG. 2, showing a detail setting screen 90 displayed at the time of editing a property of the screen component.

FIG. 12 is a view showing an example of the operation of the PC 2 in the test support system 100 of FIG. 2, and shows a detail setting screen 90 displayed on the editor screen 40 at the time of editing a property of the screen component. The detail setting screen 90 is an input screen for specifying a zoom-up ratio and the like in a case of cutting out a part of a camera image as a property of a screen component and displaying the cut-out image.

On the detail setting screen 90, a camera image display region 91, a zoom ratio input field 92, a cursor position input field 93, and a zoom center point input field 94 are arranged A camera image cut out in accordance with parameters specified in the respective input fields 92 to 94 is displayed inside the camera screen display region 91.

In a case of specifying 100% as the zoom-up ratio, the whole camera image is displayed, namely the image is displayed with one pixel of the camera 12 taken as one pixel on the screen. Further, in a case of specifying a value exceeding 100% as the zoom-up ratio, a part of the camera image is cut out, and the cut-out image region is displayed. In a case of expanding and displaying the camera image, interpolation processing is performed on pixel data.

In the method as thus described, the zoom-up ratio at the time of expanding and displaying a camera image can be specified or changed per each screen component. Since a camera image of a processing result can be displayed in association with an arbitrary processing unit on each screen component, for example, the camera images photographed with the same camera 12 can be displayed by a plurality of screen components, and can further be displayed with zoom-up ratios made different in the respective screen components <Dialog Screen>

Figure 13B:
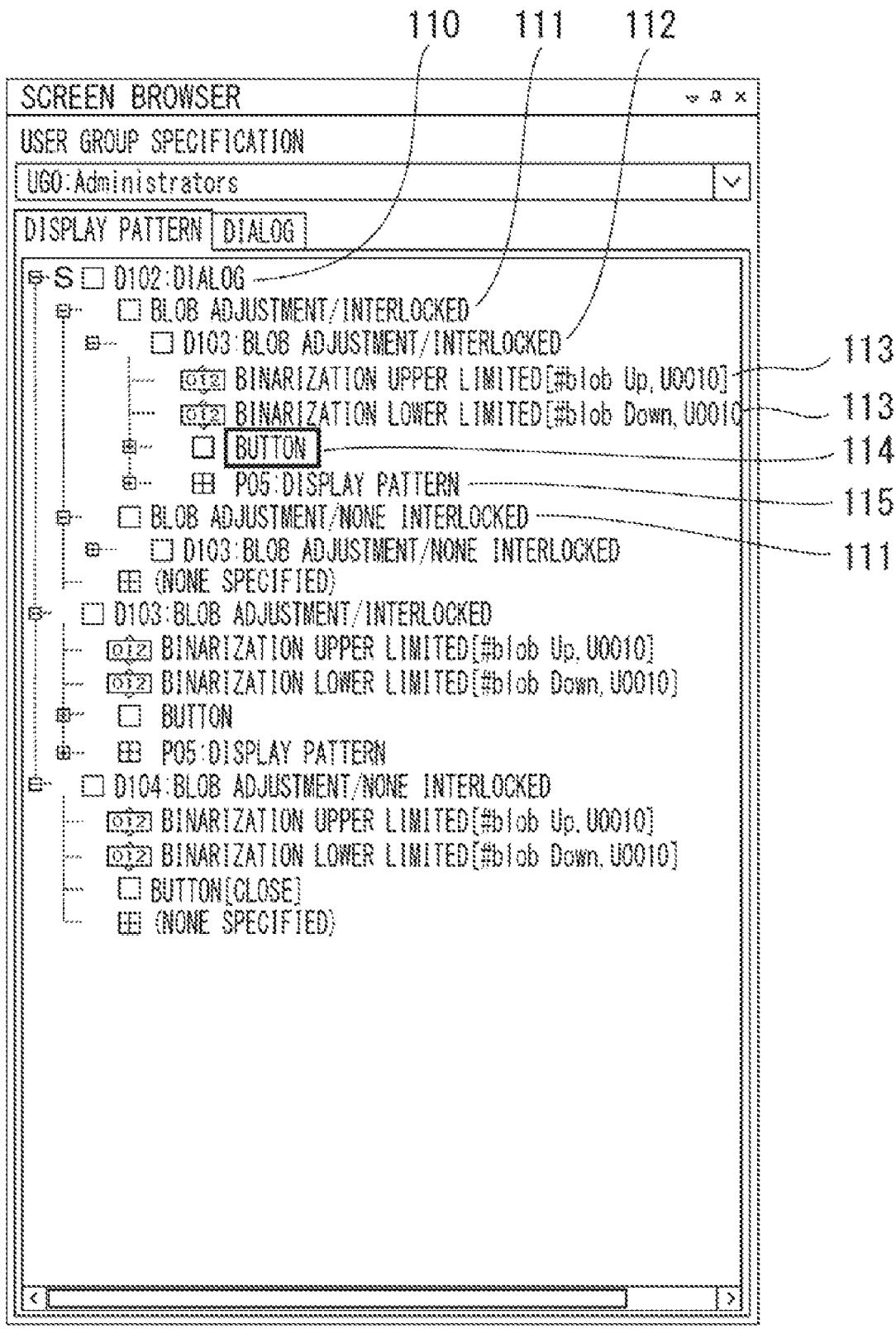
FIG. 13B is a view showing a part of FIG. 13A, showing an example of a screen browser window.
Figure 13C:
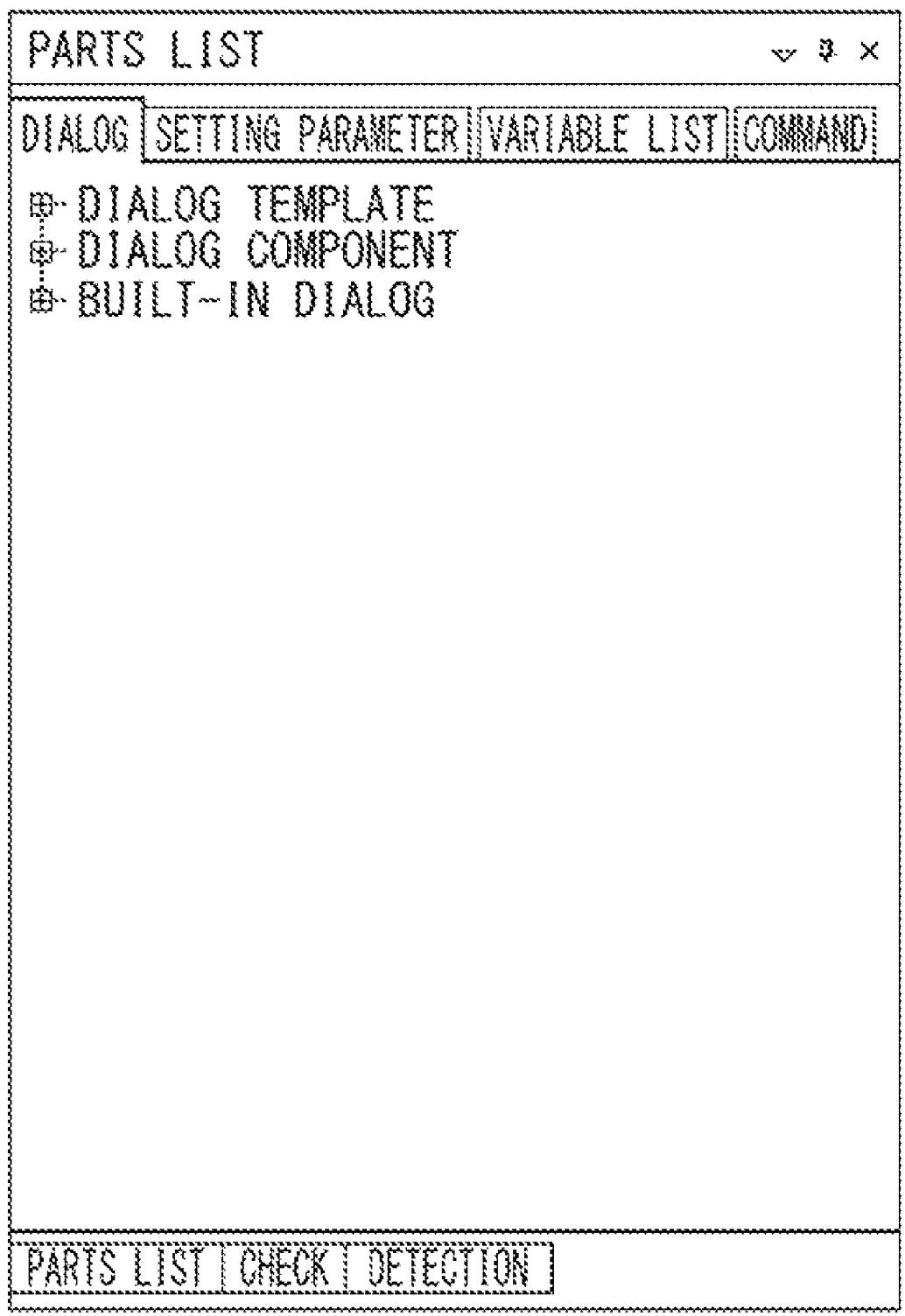
FIG. 13C is a view showing a part of FIG. 13A, showing an example of a parts-list window 42.
Figure 13D:
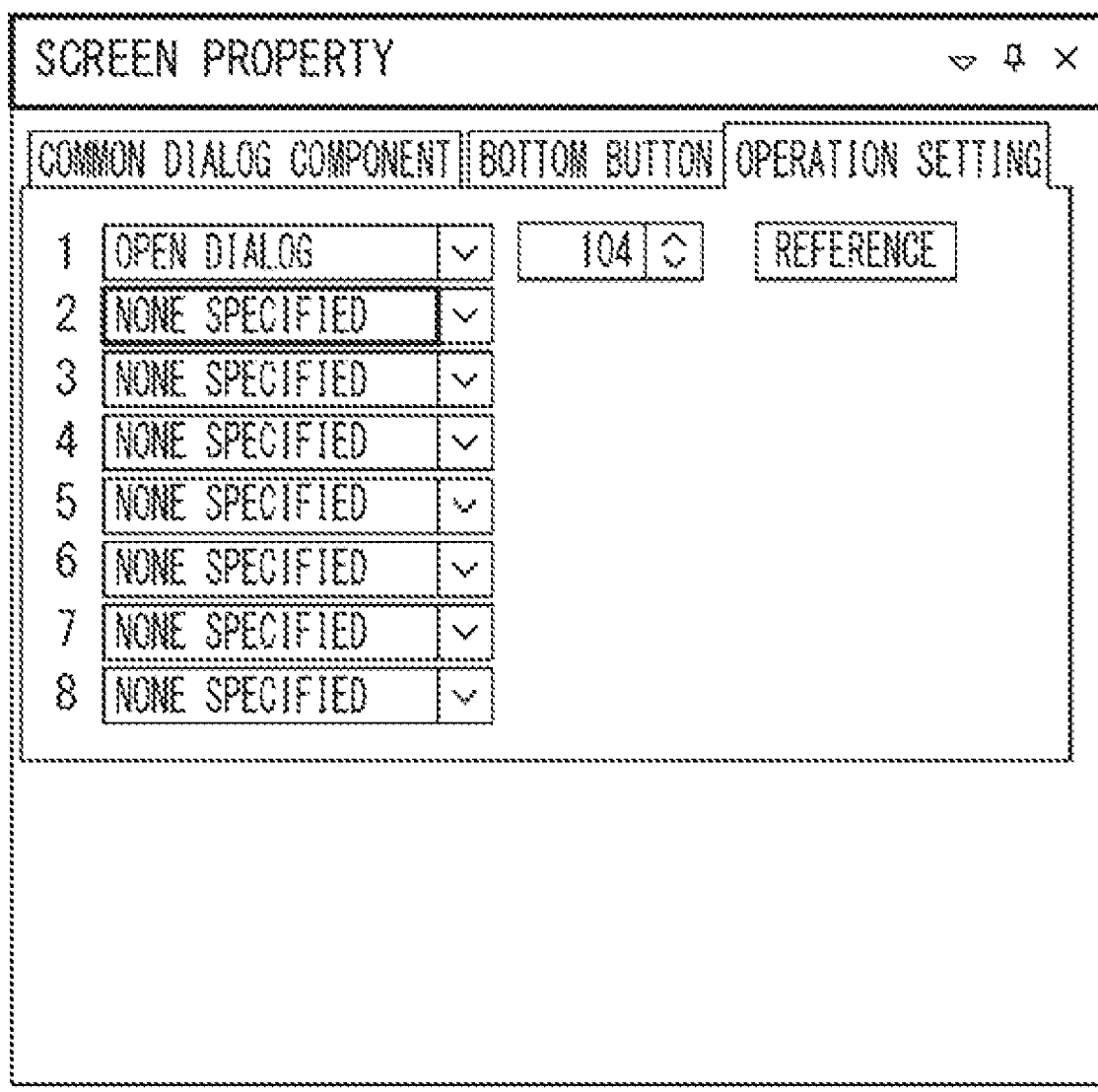
FIG. 13D is a view showing a part of FIG. 13A, showing an example of a screen property window.

FIG. 13A is a view showing an example of the operation of the PC 2 in the test support system 100 of FIG. 2, and shows the editor screen 40 where a dialog screen as an object to be edited is displayed inside the screen view window 54. On this editor screen 40, a dialog screen associated with an object to be edited selected on the screen browser screen 51 is displayed inside the display region 55 of the screen view window 54.

The dialog screen includes arrangement information of a dialog screen and a component which is used at the time of displaying the dialog screen on the display 13*a* of the image processing apparatus 1, and is formed by the user arranging a dialog screen and a dialog component inside the display region 55 of the screen view window 54.

In this example, two dialog screens 120 and 122 are arranged on a display pattern including screen components 101*a* and 101*b*. The dialog screen 120 is a dialog screen where two operation components 121 are arranged, and the dialog screen 122 is a dialog screen where two input components 123 and one operation component 124 are arranged.

The dialog screen 120 is a dialog screen always displayed in a case of the image processing controller 11 being in operation, whereas the dialog screen 122 is a dialog screen displayed by operating the operation component 121 on the dialog screen 120.

The operation component 121 is an icon for displaying another dialog screen, and the input component 123 is an input field for inputting a parameter of a processing unit. The operation component 124 is an icon for closing a dialog screen and shifting the state to a state before display of the dialog screen. Each of the dialog screens 120 and 122 is superimposed on the display pattern and displayed.

As for these dialog screens 120 and 122, properties such as a position inside the display region 55, a size, information on association with a dialog component can be edited on the screen property window 53. The user can arrange a dialog component, selected inside the parts-list window 52, on the dialog screen and specify a property of the dialog component on the screen property window 53, so as to create a desired dialog screen.

In the list display of the dialog screen data inside the screen browser screen 51, dialog screens and dialog components constituting the dialog screens are list-displayed. An icon 110 indicating a dialog screen on the uppermost hierarchical layer corresponds to the dialog screen 120 inside the display region 55, and an icon 111 indicating an operation component on the next layer corresponds to the operation component 121 on the dialog screen 120.

An icon 112 indicating a dialog screen associated with the operation component 121 corresponds to the dialog screen 122, and an icon 113 indicating an input component corresponds to the input component 123 on the dialog screen 122. Further, an icon 114 indicating an operation component corresponds to the operation component 124 on the dialog screen 122. Moreover, an icon 115 indicating a display pattern associated with the dialog screen 122 corresponds to a display pattern on display inside the display region 55.

<Page Frame>

Figure 14:
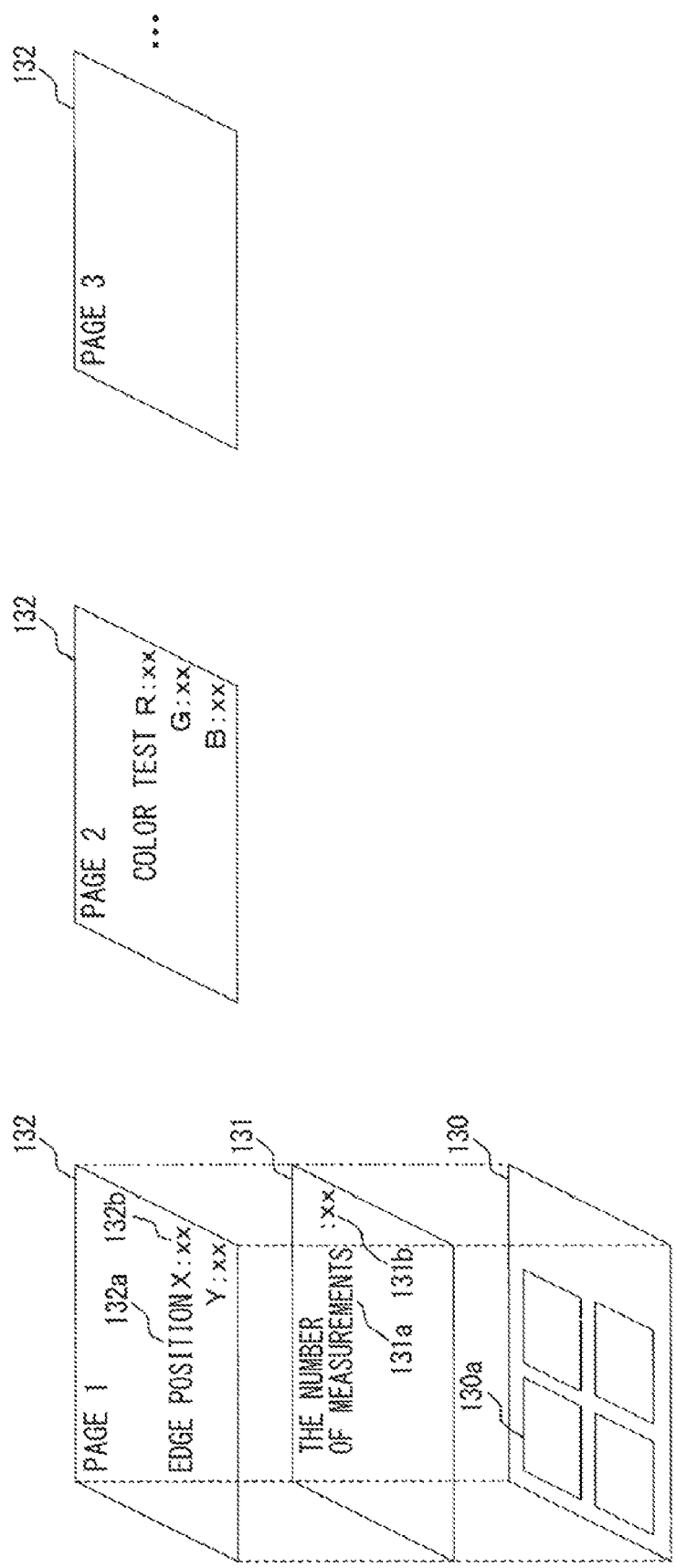
FIG. 14 is a view showing an example of the operation of the PC 2 in the test support system 100 of FIG. 2, showing a display pattern made of a plurality of page result frames 132.

FIG. 14 is a view showing an example of the operation of the PC 2 in the test support system 100 of FIG. 2, and shows a condition where a display pattern is constituted of a plurality of page result frames 132. A display pattern displayed on the display 13*a* is constituted of a screen component frame 130, a base result frame 131 and a page result frame 132.

The screen component frame 130 is a frame constituted of a screen component 130*a* arranged by the user on the screen view window 54. The base result frame 131 is a frame constituted of built-in components 131*a* and 131*b*. The page result frame 132 is a frame constituted of display components such as a result component 132*b* and a letter component 132*a*.

The display pattern is formed by synthesizing or superimposing the screen component frame 130, the base result frame 131 and the page result frame 132. Creating a plurality of page result frames 132 with different display components can create a plurality of switchable page frames where the common screen component 130*a* is arranged. That is, the display pattern is formed by the user selecting and arranging an arbitrary result component per each of these page frames.

<Detection Position Follow-Up>

Figure 15A:
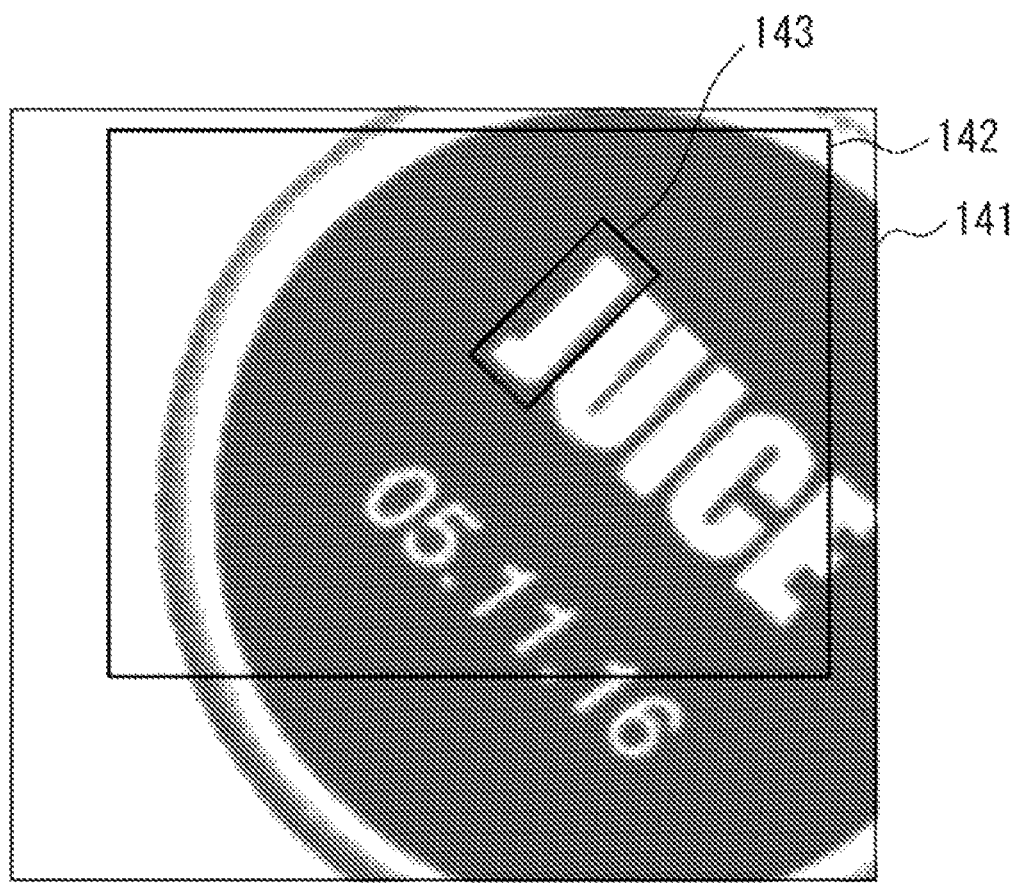
FIGS. 15A and 15B are views each showing an example of the operation of the PC 2 in the test support system 100 of FIG. 2, showing a camera image 141 and an example of a screen component.
Figure 15B:
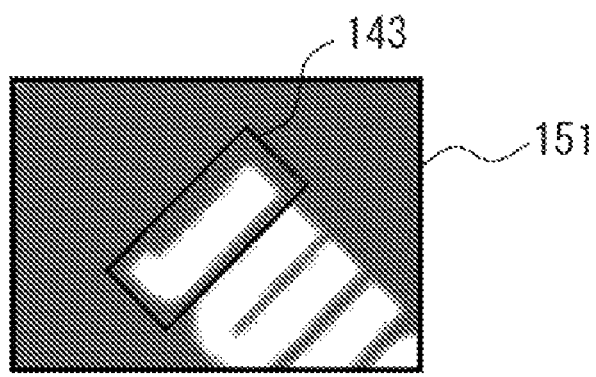

FIGS. 15A and 15B are views each showing an example of the operation of the PC 2 in the test support system 100 of FIG. 2, and show a camera image 141 showing a processing result and an example of a screen component displayed by cutting out a part of this camera image 141.

In a case of cutting out a part of the camera image using the foregoing screen component and then displaying the cut-out image, cutting out a camera image based upon a result of image processing is considered other than cutting out a camera image with a position inside an image region, which was previously specified by the user, as the center. Hereinafter, described is an example of cutting out a camera image as following up a position detected by a processing unit, and displaying the cut-out image.

FIG. 15A shows the camera image 141 graphically displaying a measurement result by pattern search. Image processing units, such as the pattern search unit and the edge position detection unit, are measurement units that measure the camera image 141 inside a measurement region 142, and generate positional information showing a position of the object to be tested inside the measurement region 142.

The measurement region 142 is previously specified as an image region which is an object to be measured, with respect to the camera image 141. For example, the measurement region 142 is specified by the user on the property edition screen of the measurement unit.

In a case of the pattern search unit, pattern search is performed with the measurement region 142 taken as a search region, and a position of an object previously specified as a search target and the number of such objects are detected. In this example, a frame 143 surrounding the detected object is graphically displayed for showing the detected position.

FIG. 15B shows a screen component 151 that displays a camera image cut out based upon a measurement result by pattern search. In a case of cutting out a part of the camera image 141 and displaying the cut-out image with the image component 151, the camera image 141 can be cut out and displayed based upon an image processing result of a processing unit. Namely, the image component 151 can display a camera image obtained by cutting out the camera image 141 based upon a processing result of a processing unit previously associated as a reference destination for a processing result.

Specifically, the camera image 141 is cut out based upon positional information of a measurement unit, using the image component 151. For example, the image component 151 cuts out the camera image 141 such that the object to be tested is located at the center of a display region at the time of displaying a camera image. In this example, the frame 143 showing an object detected by the pattern search unit is displayed at the center of the image component 151.

Even when the position of the object detected by the measurement unit is changed inside the camera image 141 by replacement of the object to be tested as the object to be photographed, the screen component 151 cuts out a camera image as following up this change in position of the object, so as to always display the object at the center. Here, cutting out a camera image based upon positional information of an object detected by the measurement unit and displaying the object at the center of a screen is referred to as detection position follow-up.

Further, in a case where the measurement unit is, for example, a processing unit that detects not only positional information as in pattern matching but also a tilt from a state as a reference, namely rotational information, a camera image is cut out based upon the rotational information in addition to the detected positional information. Thereby, even in a case where the tilt of the detected object changes, a camera image is cut out as following up the change in tilt of the object, so that the object can always be displayed at the center of the screen in the substantially same posture as the posture as the reference.

When a part of the camera image 141 is cut out and displayed using the image component 151, the position of the object to be tested can be offset in a prescribed amount and then displayed. Further, the camera image 141 can be expanded and displayed at a prescribed zoom-up ratio. An offset amount at the time of offset-displaying a camera image and a parameter such as the zoom-up ratio at the time of expanding and displaying the camera image can be specified or changed on a property edition screen of the image component 151.

<Measurement Region Follow-Up>

Figure 16A:
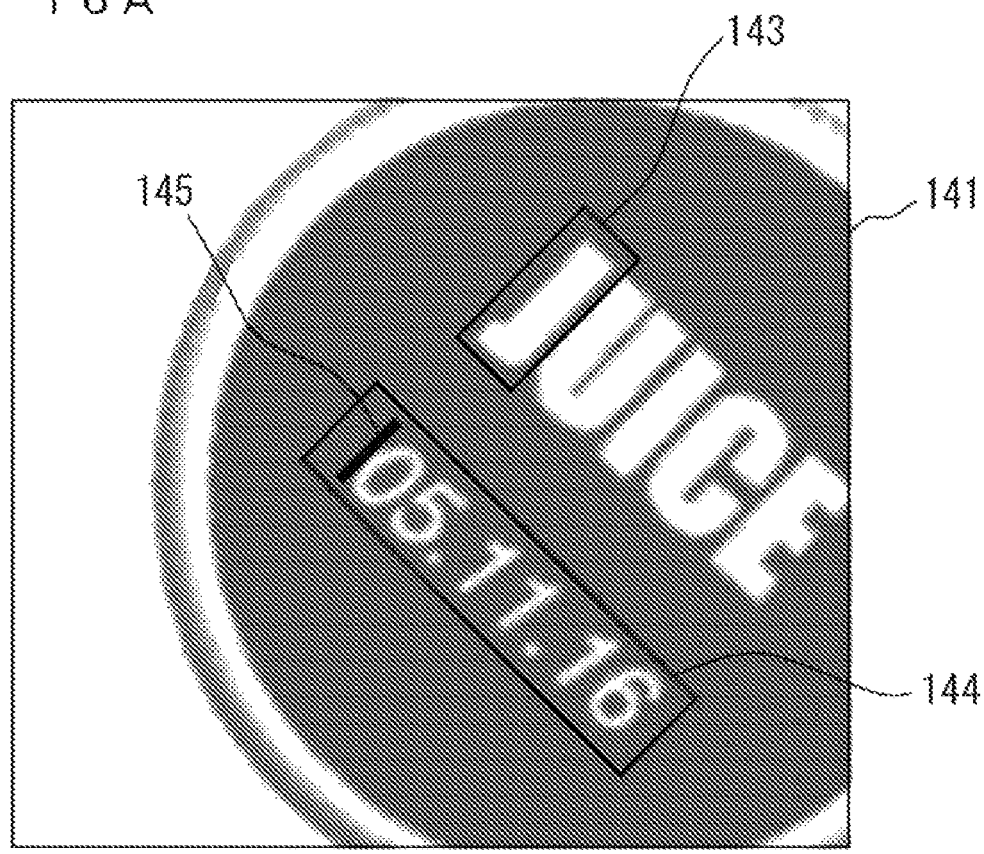
FIGS. 16A and 16B are views each showing an example of the operation of the PC 2 in the test support system 100 of FIG. 2, showing the camera image 141 and another example of the screen component.
Figure 16B:
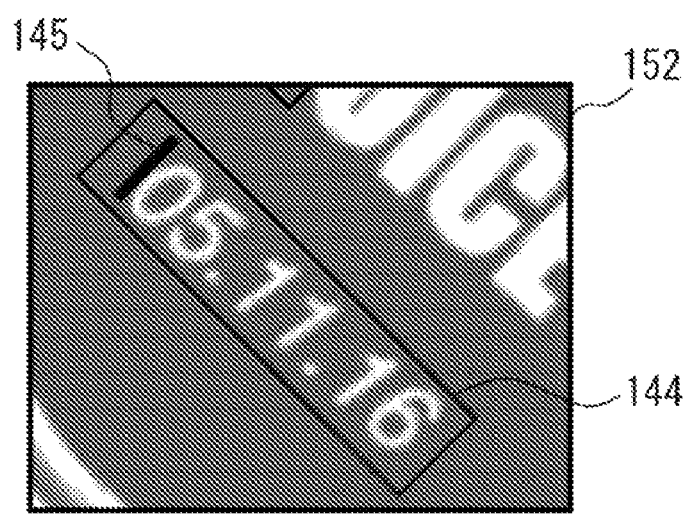

FIGS. 16A and 16B are views each showing an example of the operation of the PC 2 in the test support system 100 of FIG. 2, and show the camera image 141 showing a processing result and another example of the screen component displayed by cutting out a part of this camera image 141. FIG. 16A shows the camera image 141 graphically displaying measurement results by pattern search and edge-position detection.

A measurement region of a measurement unit can be automatically specified with reference to positional information generated by another measurement unit. Namely, a certain measurement unit (first measurement unit) is associated with a measurement unit (second measurement unit) that is executed prior to the certain measurement unit, and a measurement region is decided based upon positional information generated by the second measurement unit, and measurement is then performed.

In this example, a case is shown where the edge-position detection unit decides a measurement region based upon positional information of the pattern search unit and performs edge-position detection, and a frame 144 showing a measurement region set in accordance with a position of an object detected by pattern search is displayed. In this camera image 141, displayed are the frame 143 showing the object detected by the pattern search and the frame 144 showing the measurement region for edge-position detection.

Edge-position detection is performed with such a measurement region taken as the object to be measured, and a bar 145 showing the detected edge position is graphically displayed.

In a case of deciding a measurement region based upon the positional information of the second measurement unit, the measurement region is set such that the relative positional relation with an object detected by the second measurement unit is always constant. That is, the measurement region of the first measurement unit is set so as to follow up a change in position of the object detected by the second measurement unit even in a case where the position of the object changes inside the camera image 141 by replacement of the object to be tested as the object to be photographed.

FIG. 16B shows a screen component 152 displaying a camera image cut out in accordance with the position of the measurement region in edge-position detection. This screen component 152 is a display component that cuts out the camera image 141 based upon a measurement region decided by the first measurement unit.

Specifically, the camera image 141 is cut out based upon positional information showing a position of a measurement region decided by the first measurement unit, and the camera image is cut out such that the measurement region is located at the center of the display region. In this example, the frame 144 showing a measurement region for edge-position detection is displayed at the center of the screen component 152. Here, in a case of the first measurement unit deciding a measurement region based upon positional information of an object detected by the second measurement unit, cutting out a camera image based upon the positional information of such a measurement region and displaying the measurement region at the center of the screen is referred to as measurement region follow-up.

Further, even in a case where not only the position of the object detected by the second measurement unit but also a detected size changes due to replacement of the object to be tested as the object to be photographed, a camera image can be cut out based upon a position and a size (dimensions) of the measurement region decided by the first measurement unit, so as to display the measurement region at the center of the screen in a prescribed size (dimensions). That is, the zoom-up ratio can be automatically changed based upon the size of the measurement region decided by the first measurement unit.

Further, a configuration may be formed such that in a case where the first measurement unit is a processing unit that recognizes not only a position but also a content of an object, such as letter recognition, a barcode reader and a two-dimensional code reader, a measurement region is changed in accordance with a content of a detected object. That is, a content of an object is stored associated with information such as a position, a shape and a size of a measurement region, and a camera image is cut out based upon a measurement region decided by the first measurement unit from the content of the object and the stored contents.

<Property Edition Screen of Screen Component>

Figure 17A:
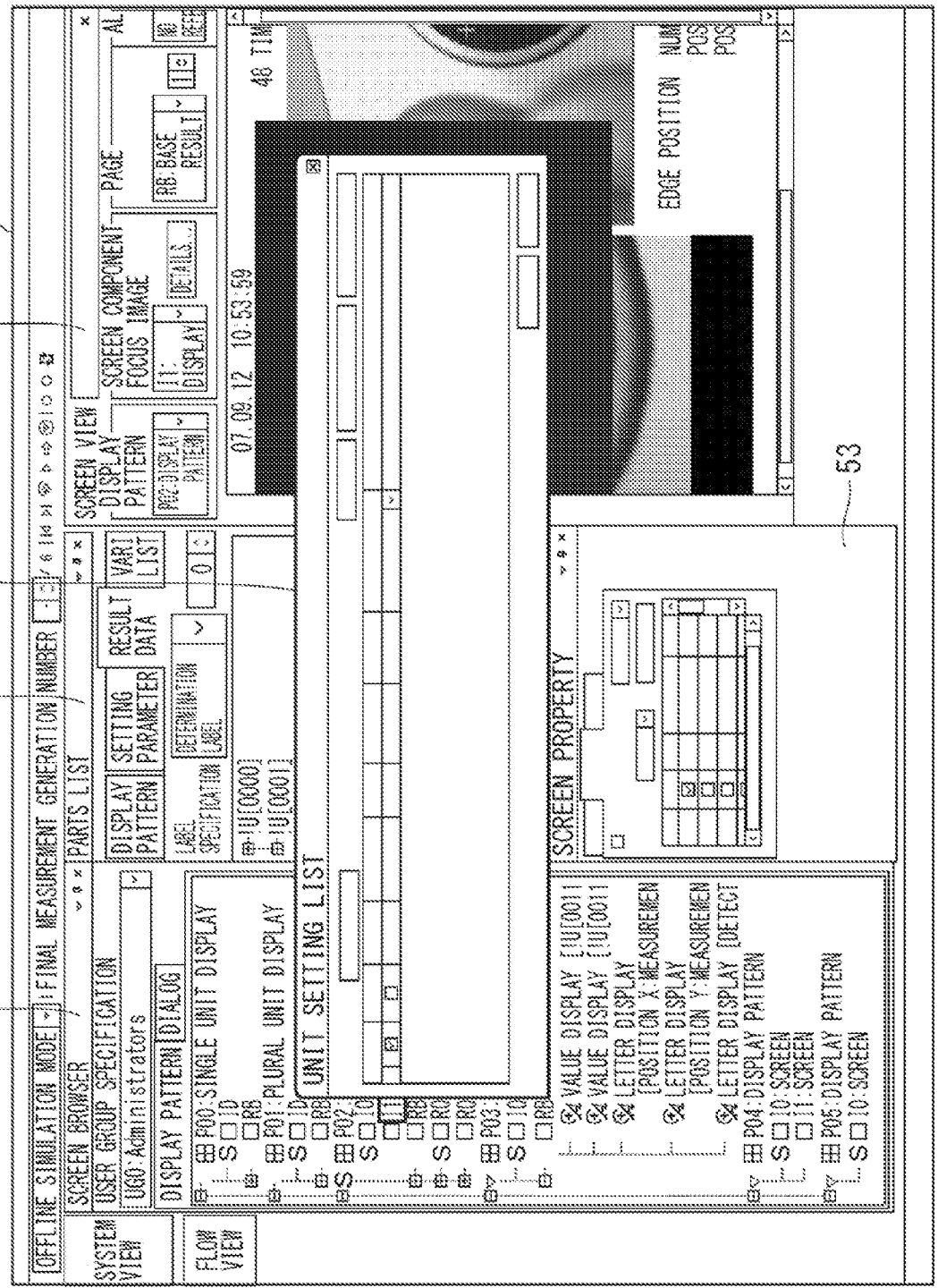
FIG. 17A is a view showing an example of the operation of the PC 2 in the test support system 100 of FIG. 2, showing a property edition screen 160 of the screen component.

FIG. 17A is a view showing an example of the operation of the PC 2 in the test support system 100 of FIG. 2, and shows a property edition screen 160 of the screen component displayed on the editor screen 40. The property edition screen 160 is a window screen for editing a property of a screen component selected on the screen browser screen 51, and processing units associated with the screen component are list-displayed as unit setting.

On this property edition screen 160, a parameter previously specified in association with a processing unit is displayed. In this example, a parameter specified with respect to the edge-position detection unit is displayed.

This property edition screen 160 is provided with an input field 162 for selecting whether or not to make a detection position and a measurement region followed up at the time of cutting out a part of a camera image and displaying the cut-out image. Specifically, any of no follow-up, detection position follow-up, and measurement region follow-up can be selected.

Further, a zoom setting button 161 is arranged for displaying a zoom setting screen on which a parameter such as the zoom-up ratio is inputted.

Figure 18:
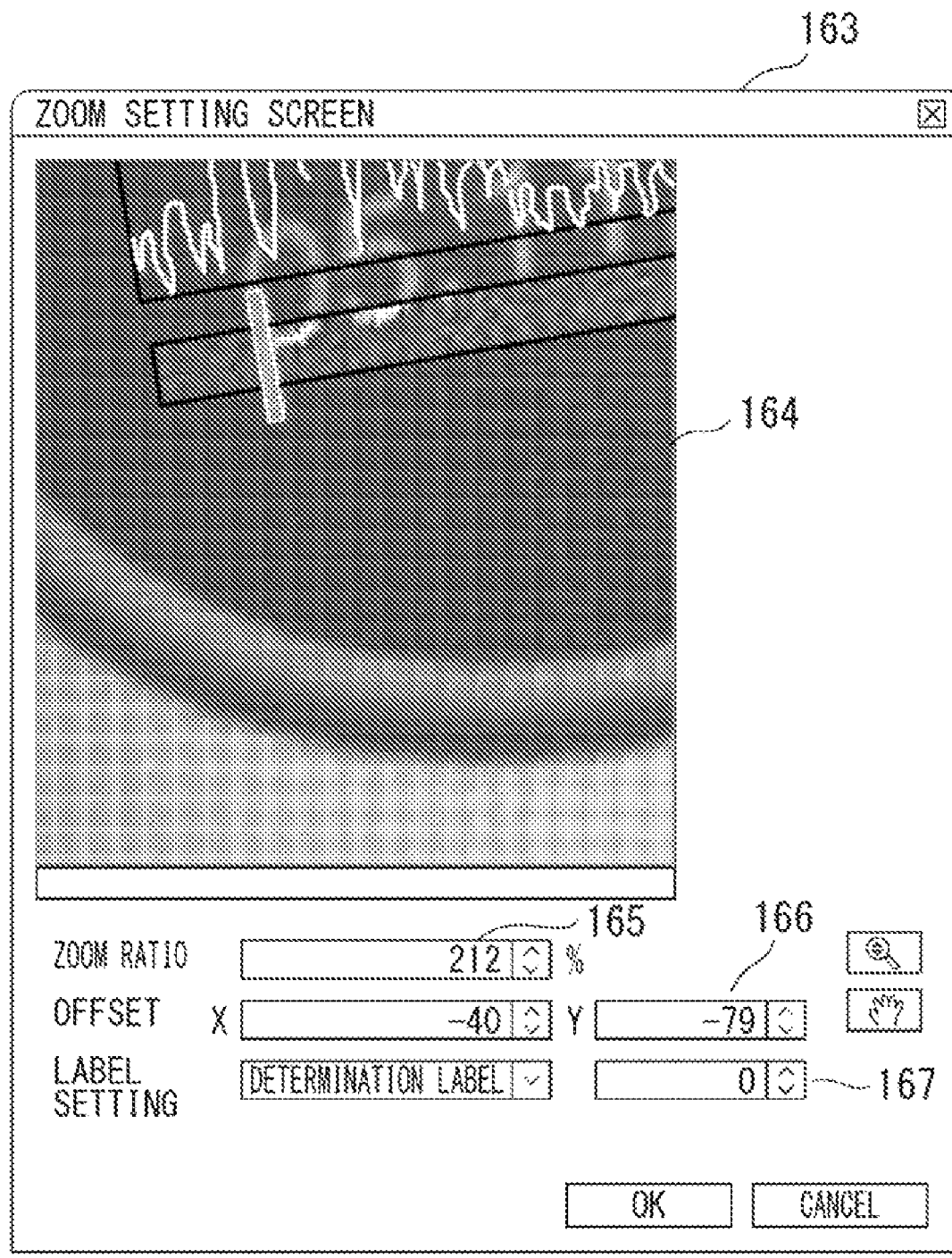
FIG. 18 is a view showing an example of the operation of the PC 2 in the test support system 100 of FIG. 2, showing a zoom setting screen 163 to be displayed at the time of editing a property of the screen component.

FIG. 18 is a view showing an example of the operation of the PC 2 in the test support system 100 of FIG. 2, and shows a zoom setting screen 163 to be displayed on the editor screen 40 at the time of editing a property of the screen component. The zoom setting screen 163 is an input screen for specifying the zoom-up ratio and the like in the case of cutting out and displaying a part of the camera image and displaying the cut-out image, as a property of the screen component.

On this zoom setting screen 163, a camera image display region 164, a zoom ratio input field 165, an offset input field 166, and a label setting input field 167 are arranged. Inside the camera image display region 164, displayed are the camera images cut out in accordance with parameters specified in the respective input fields.

The zoom ratio input field 165 is an input field for specifying the zoom-up ratio. The offset input field 166 is an input field for specifying an offset amount at the time of displaying a camera image by detection position follow-up or measurement region follow-up. The label setting input field 167 is an input field for specifying an object to be tested as an object to be displayed in a case where a plurality of objects to be tested are displayed inside the measurement region.

Figure 19A:
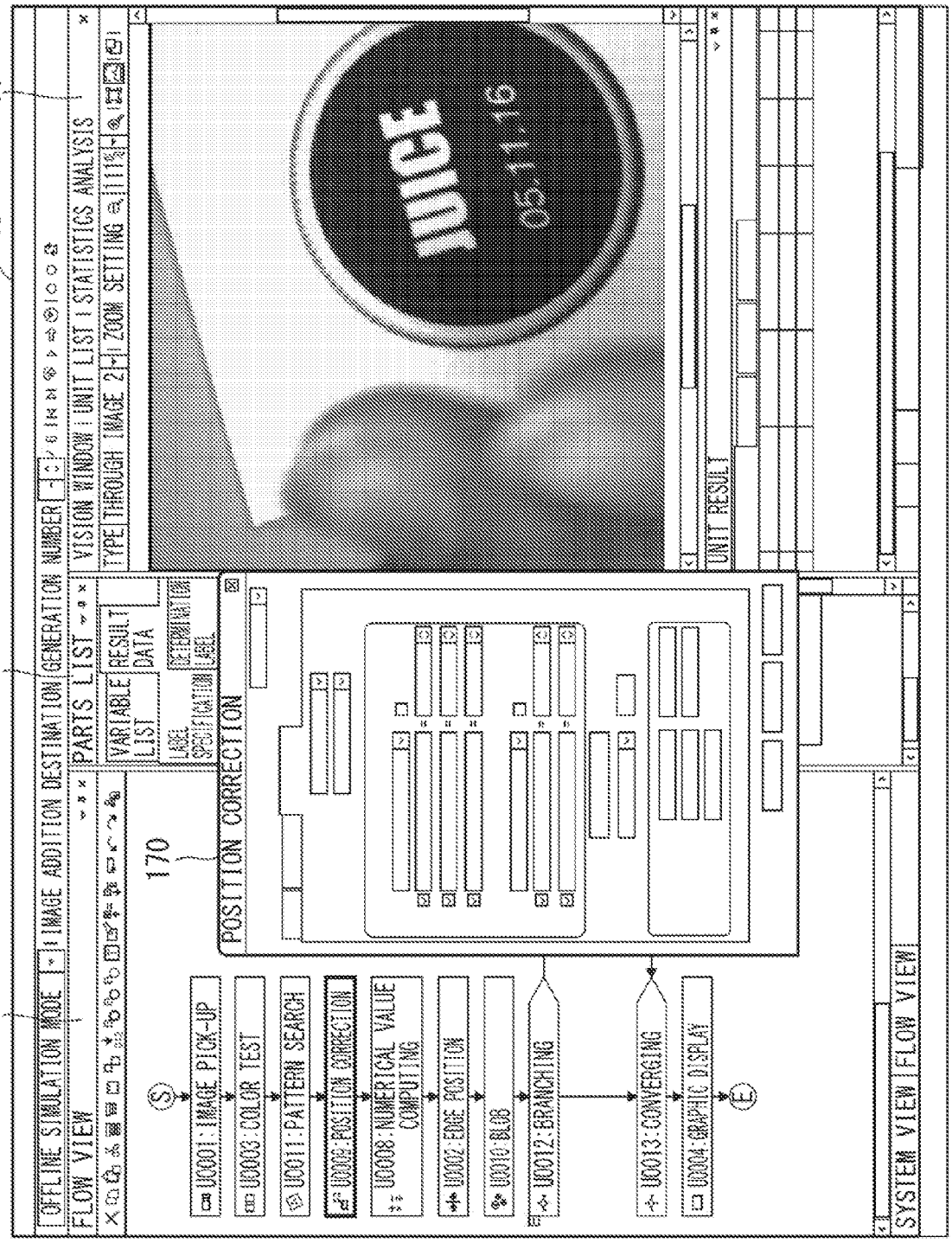
FIG. 19A is a view showing an example of the operation of the PC 2 in the test support system 100 of FIG. 2, showing a property edition screen 170 of a position correction unit.

FIG. 19A is a view showing an example of the operation of the PC 2 in the test support system 100 of FIG. 2, and shows a property edition screen 170 of a position correction unit displayed on the editor screen 40.

When the foregoing first measurement unit decides a measurement region based upon positional information of the second measurement unit, there are considered a case of setting the measurement region with direct reference to the positional information of the second measurement unit, and a case of setting the measurement region with reference to a processing result of a processing unit that performs prescribed processing by use of a measurement result of the second measurement unit, such as the position correction unit. Hereinafter, described is an example of the case of deciding the measurement region with reference to the processing result of the position correction unit that performs calculating by use of the measurement result of the second measurement unit.

The position correction unit is a processing unit for correcting positional information of a measurement unit, and performs processing for offsetting just a prescribed amount of a measurement value obtained by the measurement unit. The property edition screen 170 is a window screen for editing a property of such a position correction unit and is provided with an input field 171 for specifying a measurement unit as an object, and an input field for specifying an offset amount.

In this example, a pattern search unit is specified as a reference destination, and a position as a result of offsetting a position of an object, detected by pattern search, by a prescribed amount is generated as a correction result.

Figure 20:
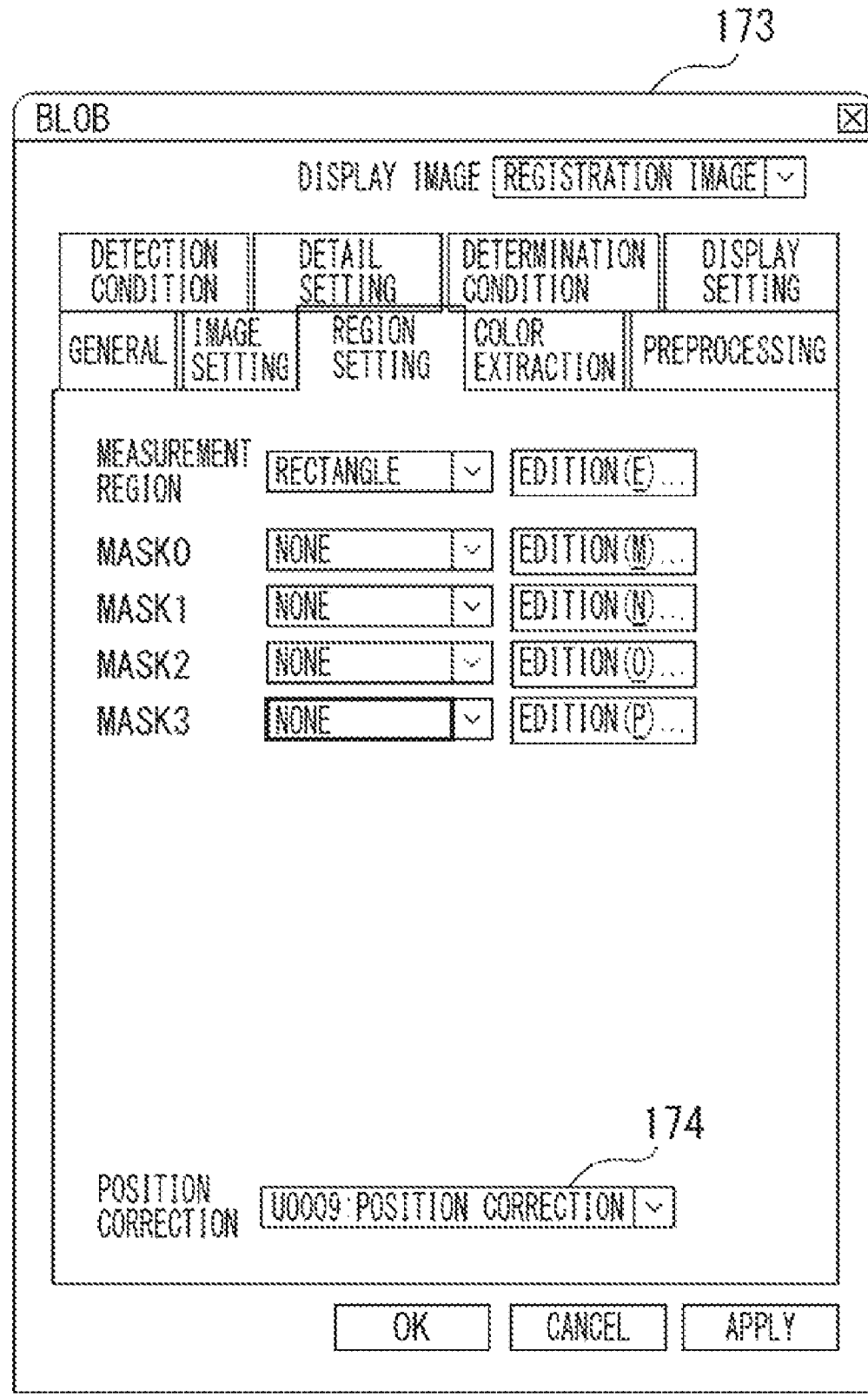
FIG. 20 is a view showing an example of the operation of the PC 2 in the test support system 100 of FIG. 2, showing a property edition screen 173 of a blob detection unit.

FIG. 20 is a view showing an example of the operation of the PC 2 in the test support system 100 of FIG. 2, and shows a property edition screen 173 of a blob detection unit displayed on the editor screen 40. In a measurement unit such as the blob detection unit a position of a measurement region is decided based upon a result of correction made by the position correction unit at the time of specifying, as a measurement region, an image region as an object to be tested on a camera image.

On this property edition screen 173, an input field 174 is provided for specifying the position correction unit as a reference destination in the case of deciding the position of the measurement region based upon a result of correction made by the position correction unit.

Figure 21A:
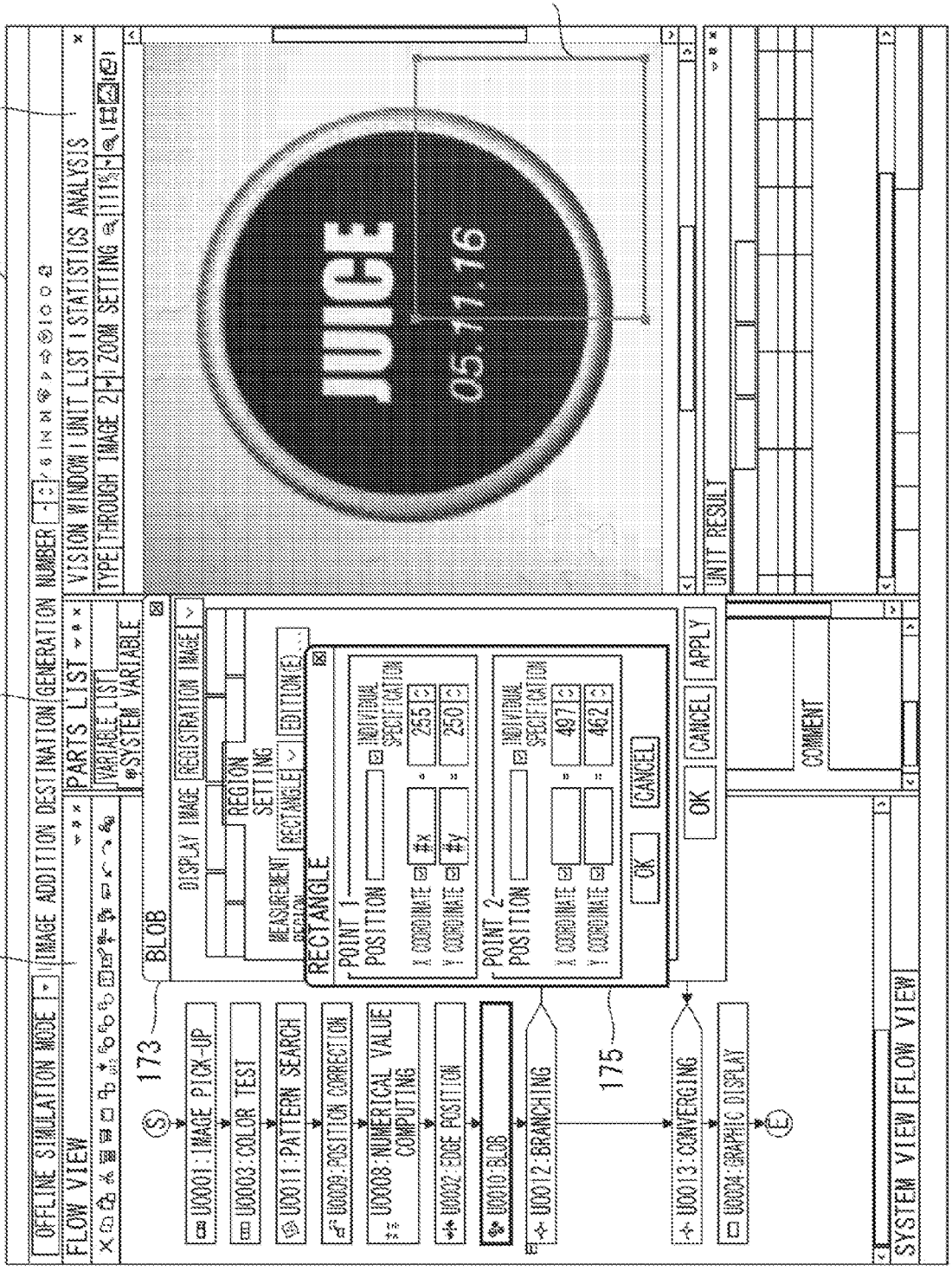
FIG. 21A is a view showing an example of the operation of the PC 2 in the test support system 100 of FIG. 2, showing a property setting screen 175 concerning the blob detection unit.

FIG. 21A is a view showing an example of the operation of the PC 2 in the test support system 100 of FIG. 2, and shows a property setting screen 175 concerning a measurement region of the blob detection unit. This property setting screen 175 is a window screen for specifying or changing a parameter concerning a measurement region.

On the property setting screen 175, a variable for referencing a result of correction made by the position correction unit is specified, and a frame 176 showing a measurement region in a rectangular shape decided by this variable is displayed on the camera image inside the vision view window 44.

When the measurement result of the pattern search unit changes, the result of correction made by the position correction unit also changes, and hence the position of the measurement region of the blob detection unit changes as following up the measurement result of pattern search. In the case of cutting out a part of the camera image and displaying the cut-out image with a screen component, the camera image can be displayed as following up the measurement region of the measurement unit as thus described.

<Functional Configuration of Editor>

FIG. 22 is a block diagram showing a configurational example of the PC 2 in the test support system 100 of FIG. 2, and shows an example of a functional configuration of an editor that creates a control program of the image processing controller 11. This PC 2 is configured by a processing unit storing section 201, a flowchart generating section 202, a flowchart storing section 203, a program generating section 204, a memory 21, a display component storing section 205, a dialog component storing section 206, a display pattern generating section 207, a dialog screen generating section 208, a display pattern storing section 209, a dialog screen storing section 210, a layout information generating section 211, and a transfer section 212.

The processing unit storing section 201 holds processing units such as a display pattern switch unit 201a and a dialog display unit 201b. The flowchart generating section 202 performs an operation of arranging a processing unit on an execution flow that is started with a start symbol and completed with an end symbol, to generate a flowchart.

In the flowchart storing section 203, a flowchart generated by the flowchart generating section 202 is held, and this flowchart is displayed inside the flow view window 46. The program generating section 204 converts the flowchart held in the flowchart storing section 203 into an execution form, to perform an operation of generating a control program for the image processing controller 11.

In the memory 21, held as test setting data 22 are a control program 22a generated by the program generating section 204 and layout information 22b generated by the layout information generating section 211. The transfer section 212 performs an operation of transferring the test setting data 22 inside the memory 21 to the image processing controller 11.

The display component storing section 205 holds display components such as a screen component 205a and a result component 205b as display components to be arranged on the display 13a. The dialog component storing section 206 holds dialog components such as an operation component 206a and an input component 206b.

The display pattern generating section 207 associates each of screen components and result components with a specific processing unit inside the flowchart, and performs an operation of generating a display pattern including arrangement information of a plurality of display components associated with processing units. This display pattern is formed by the user arranging a display component on the screen view window 54, and stored inside the display pattern storing section 209.

The dialog screen generating section 208 performs an operation of arranging a dialog component to generate a dialog screen including arrangement information of the dialog component, and storing the generated screen inside the dialog screen storing section 210. The operation dialog can be formed by associating an operation component with a dialog screen to be displayed at the time of operating the operation component. Further, an input dialog is formed by associating an input component with a processing unit that rewrites a parameter through the input component.

The layout information generating section 211 performs an operation of generating, as layout information for defining a display mode on the display 13a, the layout information including a dialog screen and a plurality of display patterns switchably displayed on the display 13a.

According to the present embodiment, a screen component cuts out a camera image based upon an image processing result of a processing unit at the time of cutting out a part of the camera image and displaying the cut-out image on the display 13a, so as to display a camera image showing the processing result of the processing unit. In particular, since a camera image is cut out based upon positional information showing a position of the object to be tested, a camera image showing a measurement result of the measurement unit can be displayed in accordance with the position of the object to be tested.

Further, since a camera image is cut out based upon an image region decided by the first measurement unit as an object to be measured, a camera image showing a processing result of the first measurement unit can be appropriately displayed in accordance with a position of the image region.

What is claimed is:

1. A program creation apparatus for an image processing controller, which creates a control program for the image processing controller used in an image processing apparatus including
    a camera which photographs an object to be tested, to generate a camera image,
    the image processing controller which extracts a measurement result from the camera image and determines a quality of the object to be tested based upon this measurement result to output a determination signal, and
    a display which is display-controlled by the image processing controller and displays the measurement result,
    the program creation apparatus comprising:
    a display component storing part for holding, as display components to be arranged on the display, a camera image display component for displaying the camera image and a measurement result display component for displaying the measurement result;
    a processing unit storing part for holding two or more processing units showing image processing in which a parameter is changeable;
    a flow chart generating part for arranging the processing units on an execution flow that is started with a start symbol and completed with an end symbol, to generate a flowchart;
    a program generating part for generating a control program for the image processing controller based upon the flowchart;
    a display pattern generating part for associating the display components with the processing units inside the flowchart and also arranging the display components on an edition screen, to generate a display pattern including arrangement information of two or more display components associated with the processing units in order to display a result of image processing; and
    a transfer part for transferring the control program and the display pattern to the image processing controller,
    wherein the camera image display component is a display component that cuts out a part of the camera image and displays the cut-out image on the display, as well as a display component that cuts out a camera image and displays the cut-out image based upon an image processing result of the processing unit associated by the display pattern generating part.

2. The program creation apparatus for an image processing controller according to claim 1, wherein
    the processing unit storing part holds as the processing unit a measurement unit that measures an inside of an image region, previously specified as an object to be tested, in the camera image and generates, as the measurement result, positional information showing a position of the object to be tested inside this image region, and
    the camera image display component is a display component that cuts out a camera image based upon the positional information of the measurement unit.

3. The program creation apparatus for an image processing controller according to claim 2, wherein in a case where a first of the measurement unit is a processing unit that decides an image region as an object to be tested based upon the positional information of a second of the measurement unit and measures the image region, the camera image display component is a display component that cuts out a camera image based upon the image region decided by the first measurement unit.

4. The program creation apparatus for an image processing controller according to claim 2, wherein the camera image display component is a display component that cuts out a camera image such that the object to be tested is located at a center of a display region when displaying the camera image.

5. The program creation apparatus for an image processing controller according to claim 1, wherein the camera image display component is a display component that expands and displays a camera image as compared with a display component that displays a whole camera image.

6. The program creation apparatus for an image processing controller according to claim 2, wherein the camera image display component is a display component that expands and displays a camera image as compared with a display component that displays a whole camera image.

* * * * *